(12) United States Patent
Hamilton, II et al.

(10) Patent No.: US 8,624,903 B2
(45) Date of Patent: Jan. 7, 2014

(54) MODIFYING A DISPLAY QUALITY OF AN AREA IN A VIRTUAL UNIVERSE ACCORDING TO AVATAR CHARACTERISTICS

(75) Inventors: Rick A. Hamilton, II, Charlottesville, VA (US); Paul A. Moskowitz, Yorktown Heights, NY (US); Brian M. O'Connell, Cary, NC (US); Clifford A. Pickover, Yorktown Heights, NY (US); James W. Seaman, Falls Church, VA (US)

(73) Assignee: Activision Publishing, Inc., Santa Monica, CA (US)

( * ) Notice: Subject to any disclaimer, the term of this patent is extended or adjusted under 35 U.S.C. 154(b) by 1 day.

(21) Appl. No.: 13/169,881

(22) Filed: Jun. 27, 2011

(65) Prior Publication Data
US 2011/0254853 A1    Oct. 20, 2011

Related U.S. Application Data

(63) Continuation of application No. 11/932,114, filed on Oct. 31, 2007, now Pat. No. 8,013,861.

(51) Int. Cl.
G06T 13/00 (2011.01)
(52) U.S. Cl.
USPC ............................. 345/473; 345/418; 345/420
(58) Field of Classification Search
None
See application file for complete search history.

(56) References Cited

U.S. PATENT DOCUMENTS

| 5,502,794 | A | * | 3/1996 | Sakurai ........................... 358/1.9 |
| 5,736,990 | A | | 4/1998 | Barrus et al. |
| 5,764,232 | A | * | 6/1998 | Oouchi ........................... 345/419 |
| 5,879,236 | A | | 3/1999 | Lambright |
| 6,072,498 | A | | 6/2000 | Brittain et al. |
| 6,256,043 | B1 | | 7/2001 | Aho et al. |
| 6,327,541 | B1 | | 12/2001 | Pitchford et al. |
| 6,421,051 | B1 | * | 7/2002 | Kato .............................. 345/428 |
| 6,598,029 | B1 | | 7/2003 | Johnson et al. |
| 6,631,309 | B2 | | 10/2003 | Boies et al. |
| 6,672,961 | B1 | | 1/2004 | Uzun |
| 6,767,287 | B1 | | 7/2004 | Mcquaid et al. |
| 6,785,592 | B1 | | 8/2004 | Smith et al. |
| 6,912,565 | B1 | | 6/2005 | Powers et al. |

(Continued)

FOREIGN PATENT DOCUMENTS

JP     2003061263     2/2003

OTHER PUBLICATIONS

U.S. Appl. No. 11/931,826, filed Oct. 31, 2007, Hamilton, II, Rick A.

(Continued)

*Primary Examiner* — Said Broome
(74) *Attorney, Agent, or Firm* — Pillsbury Winthrop Shaw Pittman LLP

(57) ABSTRACT

Described herein are processes and devices that modify a display quality of an area of a virtual universe. Some embodiments include operations to determine a number of avatars that occupy the area, determine a display quality of the area that can be reduced to conserve a computing resource that processes data to present the area and modify the display quality of the area proportionally to the number of avatars that occupy the area. The operations can further modify usage of a computing resource to process data to present the area in response to modification of the display quality of the area.

21 Claims, 13 Drawing Sheets

(56) References Cited

U.S. PATENT DOCUMENTS

| | | |
|---|---|---|
| 6,937,946 B1 | 8/2005 | Culp et al. |
| 7,096,360 B1 | 8/2006 | Fries |
| 7,135,956 B2 | 11/2006 | Bartone et al. |
| 7,171,287 B2 | 1/2007 | Weiss |
| 7,358,973 B2 | 4/2008 | Herbrich et al. |
| 7,805,680 B2 | 9/2010 | Meyers et al. |
| 8,013,861 B2 | 9/2011 | Hamilton et al. |
| 8,086,544 B2 | 12/2011 | Boss et al. |
| 8,127,297 B2 | 2/2012 | Hamilton, II et al. |
| 8,199,145 B2 | 6/2012 | Hamilton, II et al. |
| 8,214,843 B2 | 7/2012 | Boss et al. |
| 8,234,016 B2 | 7/2012 | Boss et al. |
| 2002/0062177 A1 | 5/2002 | Hannaford et al. |
| 2003/0057884 A1 | 3/2003 | Dowling et al. |
| 2003/0128210 A1* | 7/2003 | Muffler et al. .......... 345/428 |
| 2003/0210271 A1 | 11/2003 | King |
| 2004/0098142 A1 | 5/2004 | Warren et al. |
| 2004/0215536 A1 | 10/2004 | Deliwala et al. |
| 2004/0254899 A1 | 12/2004 | Abe et al. |
| 2005/0024362 A1 | 2/2005 | Klein |
| 2005/0024376 A1* | 2/2005 | Gettman et al. ......... 345/582 |
| 2005/0033601 A1 | 2/2005 | Kirby et al. |
| 2005/0080894 A1 | 4/2005 | Apostolopoulos et al. |
| 2005/0165512 A1 | 7/2005 | Peljto |
| 2005/0253843 A1* | 11/2005 | Losasso Petterson et al. .............. 345/428 |
| 2006/0119598 A1 | 6/2006 | Littlefield |
| 2006/0135261 A1 | 6/2006 | Kinne et al. |
| 2007/0005466 A1 | 1/2007 | Rosenblatt et al. |
| 2007/0061201 A1 | 3/2007 | Ellis et al. |
| 2007/0097206 A1* | 5/2007 | Houvener et al. ......... 348/26 |
| 2007/0219645 A1 | 9/2007 | Thomas et al. |
| 2007/0244604 A1 | 10/2007 | McNally |
| 2008/0074415 A1 | 3/2008 | Woo et al. |
| 2008/0177423 A1 | 7/2008 | Brickfield et al. |
| 2008/0207322 A1 | 8/2008 | Mizrahi |
| 2008/0255899 A1 | 10/2008 | McConnell et al. |
| 2008/0313011 A1 | 12/2008 | Rose et al. |
| 2009/0063228 A1 | 3/2009 | Forbes |
| 2009/0109229 A1 | 4/2009 | Hamilton, II et al. |
| 2009/0113338 A1 | 4/2009 | Hamilton, II et al. |
| 2009/0113421 A1 | 4/2009 | Hamilton, II et al. |
| 2009/0118019 A1 | 5/2009 | Perlman et al. |
| 2009/0187782 A1 | 7/2009 | Greene et al. |
| 2009/0278841 A1 | 11/2009 | Hamilton, II et al. |
| 2009/0281743 A1 | 11/2009 | Hamilton, II et al. |
| 2009/0281885 A1 | 11/2009 | Castelli et al. |
| 2009/0281886 A1 | 11/2009 | Castelli et al. |
| 2010/0050004 A1 | 2/2010 | Hamilton, II et al. |
| 2010/0052872 A1 | 3/2010 | Boss et al. |
| 2010/0057529 A1 | 3/2010 | Boss |
| 2010/0057625 A1 | 3/2010 | Boss et al. |
| 2010/0057641 A1 | 3/2010 | Boss et al. |
| 2010/0058350 A1 | 3/2010 | Boss et al. |
| 2010/0070807 A1 | 3/2010 | Hamilton, II et al. |
| 2010/0083107 A1 | 4/2010 | Allen et al. |
| 2010/0107084 A1 | 4/2010 | Hamilton, II et al. |
| 2010/0220097 A1 | 9/2010 | Hamilton, II et al. |
| 2010/0332997 A1 | 12/2010 | Hamilton, II et al. |
| 2011/0055726 A1 | 3/2011 | Hamilton, II et al. |
| 2011/0113018 A1 | 5/2011 | Hamilton, II et al. |
| 2011/0131226 A1 | 6/2011 | Chandra et al. |
| 2011/0225276 A1 | 9/2011 | Hamilton, II et al. |
| 2012/0113127 A1 | 5/2012 | Hamilton, II et al. |
| 2012/0117233 A1 | 5/2012 | Hamilton, II et al. |
| 2012/0188278 A1 | 7/2012 | Hamilton, II et al. |

OTHER PUBLICATIONS

U.S. Appl. No. 11/932,114, filed Oct. 31, 2007, Hamilton, II, Rick A.
U.S. Appl. No. 11/932,319, filed Oct. 31, 2007, Hamilton, II, Rick A.
U.S. Appl. No. 12/115,963, filed May 6, 2008, Hamilton, II, Rick A.
U.S. Appl. No. 12/194,633, filed Aug. 20, 2008, Hamilton, II, Rick A.
U.S. Appl. No. 12/203,329, filed Sep. 3, 2008, Boss, Gregory J., et al.
U.S. Appl. No. 12/203,345, filed Sep. 3, 2008, Boss, Gregory J., et al.
U.S. Appl. No. 12/203,366, filed Sep. 3, 2008, Boss, Gregory J., et al.
U.S. Appl. No. 12/203,379, filed Sep. 3, 2008, Boss, Gregory J., et al.
U.S. Appl. No. 12/203,399, filed Sep. 3, 2008, Boss, Gregory J., et al.
U.S. Appl. No. 12/239,378, filed Sep. 26, 2008, Allen, Sheila E.
"U.S. Appl. No. 11/932,114 Office Action", Oct. 29, 2010, 18 pages.
"U.S. Appl. No. 11/932,319 Office Action", May 26, 2011, 22 pages.
"U.S. Appl. No. 12/115,958 Office Action", Oct. 28, 2010, 13 pages.
"U.S. Appl. No. 12/117,348 Office Action", May 12, 2010, 12 pages.
"U.S. Appl. No. 12/117,360 Office Action", Mar. 25, 2011, 23 pages.
Trefftz, Helmuth et al., "Local and Global Impact of Message Caching in Shared Virtual Environments", *Proceedings of the IASTED International Conference on Computer Graphics and Imaging 2000 (CGIM 200)* Las Vegas, NV Nov. 20, 2000, 8-13.
"U.S. Appl. No. 11/931,826 Office Action", Jul. 11, 2011, 23 pages.
"U.S. Appl. No. 12/115,963 Office Action", Jul. 22, 2011, 26 pages.
"U.S. Appl. No. 12/194,633 Office Action", Aug. 2, 2011, 22 pages.
U.S. Appl. No. 13/616,210, filed Sep. 14, 2012, Hamilton II, Rick A., et al.
"U.S. Appl. No. 12/194,633 Final Office Action", Mar. 12, 2012, 16 pages.
"U.S. Appl. No. 13/352,266 Office Action", Mar. 16, 2012, 28 pages.
"U.S. Appl. No. 13/352,270 Office Action", Apr. 5, 2012, 28 pages.
U.S. Appl. No. 13/352,266, filed Jan. 17, 2012, Hamilton, Rick A., et al.
U.S. Appl. No. 13/352,270, filed Jan. 17, 2012, Hamilton, Rick A., et al.

* cited by examiner

MODIFYING A DISPLAY QUALITY OF AN AREA IN A VIRTUAL UNIVERSE ACCORDING TO AVATAR CHARACTERISTICS

RELATED APPLICATIONS

This application claims the priority benefit of U.S. application Ser. No. 11/932,114 filed Oct. 31, 2007.

BACKGROUND

1. Technical Field

Embodiments of the inventive subject matter relate generally to virtual universe systems, and more particularly to modifying a display quality of an area in a virtual universe.

2. Background Art

Virtual universe applications allow people to socialize and interact in a virtual universe. A virtual universe ("VU") is a computer-based simulated environment intended for its residents to traverse, inhabit, and interact through the use of avatars. Many VUs are represented using 3-D graphics and landscapes, and are populated by many thousands of users, known as "residents." Other terms for VUs include metaverses and "3D Internet."

SUMMARY

Described herein are processes and devices that reduce a display quality of an area of a virtual universe to conserve computing resources. One of the devices described is a virtual resource conserver. The virtual resource conserver determines, or selects, an area in the virtual universe. A computing resource processes data for presenting the area in the virtual universe. The virtual resource conserver evaluates significance factors about the area to determine a significance of how the area is being used, or an extent to which an area is being viewed by an avatar. The virtual resource conserver reduces a display quality of the area based on the significance of how the area is being used or viewed. The virtual resource conserver thus reduces usage of the computing resource.

BRIEF DESCRIPTION OF THE DRAWING(S)

The present embodiments may be better understood, and numerous objects, features, and advantages made apparent to those skilled in the art by referencing the accompanying drawings.

DESCRIPTION OF EMBODIMENTS

The description that follows includes exemplary systems, methods, techniques, instruction sequences and computer program products that embody techniques of embodiments of the invention(s). However, it is understood that the described embodiments of the invention(s) may be practiced without these specific details. For instance, although examples refer to smart objects that can automatically recognize indications to conserve computing resources, other examples include devices that are not smart objects, but that also determine indications to conserve computing resources. In other instances, well-known instruction instances, protocols, structures and techniques have not been shown in detail in order not to obfuscate the description.

Introduction

Figure 1:
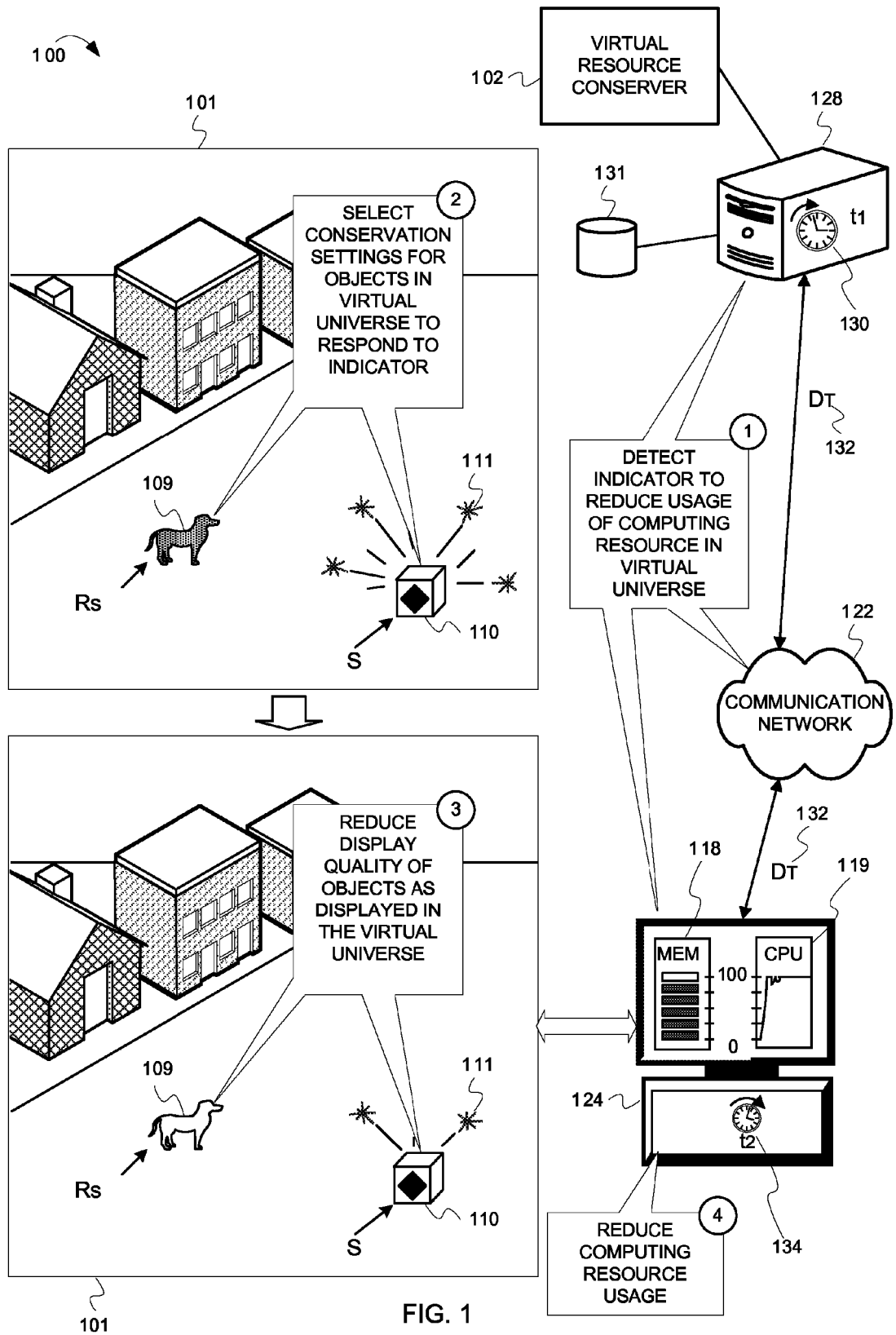
FIG. 1 is an illustration of an example virtual resource conserver 102 within an operating environment 100.

Virtual universes (VUs) are becoming increasingly popular for both social and business use. Unfortunately, VUs demand large amounts of computing resources from servers, clients, and almost any network device utilized in a VU network. For example, many objects within a VU are intended to draw attention, for example, by exhibiting flashy characteristics like emitting sparkles, spinning, glowing, changing color, etc. Processing data to render the flashy characteristics demands significant computer processing. FIG. 1 shows how some objects can work with a virtual resource conserver to conserve computing resources in a VU environment.

FIG. 1 is an illustration of an example virtual resource conserver 102 within an operating environment 100. In FIG. 1, a server 128 is connected to a communication network 122. A client 124 is also connected to the communication network 122. The server 128 hosts a virtual universe 101. The client 124 communicates with the server 128, via the communication network 122, to obtain data that the client 124 processes to render a perspective of the virtual universe 101. A virtual resource conserver 102 is connected to the server 128, although in another example, the virtual resource conserver 102 could be connected to the communication network 122 or the client 124. In addition, the virtual resource conserver can be embodied in a server and/or client. A database 131 is connected to the server 128, although the database 131 could also be connected to the communication network 122.

The virtual resource conserver 102, in stage "1", detects an indicator to reduce usage of a computing resource in the virtual universe 101. Examples of indicators include messages or signals, generated automatically or manually, that indicate resources on the network devices, such as the server 128 or the client 124, are experiencing busy times, poor performance, usage maximization, etc. Computing resources include devices or system components that process, display, or otherwise compute data that can be used in the virtual universe 101. Computing resources include any physical or virtual component of limited availability within a computer system or operating environment. Some examples of computing resources include any device of limited availability within the operating environment 100, such as the server 128, the client 124, the database 131, and other devices, not shown, that could be included in a communication network 122, such as routers, domain controllers, etc. Other examples of computing resources include components of limited availability within devices, such as processors, memory (e.g., random access memory, virtual memory, etc.), hard disk space, etc.

The client 124 displays a memory usage monitor 118 and processor usage monitor 119, both of which indicate that the internal memory and processor resources are near a maximum usage level. Consequently, the client 124 generates an indicator that its resources are being overused, for example, when usage rises above a pre-determined level. As a result, the virtual resource conserver 102 detects the indicator and recognizes it as an opportunity to reduce usage of computing resources.

The virtual universe 101 includes an object 109 (depicted as a dog) and an object 110 (depicted as a jeweled box). The objects 109, 110 have displayable characteristics, such as actions and properties, which can be displayed within the virtual universe 101. Examples of some displayable characteristics include a number of triangles devoted to render the objects 109, 110, movements of the objects 109, 110, physical characteristics of the objects 109, 110 (e.g., color or texture), actions performed by the objects 109, 110 (e.g., communicating, using items, etc.), a sparkle effect, an amount of luminosity, a location of the objects 109, 110 (e.g., inside or outside of an inventory), etc. The displayable characteristics can correspond to functions and operations provided by one of the computing resources, such as a refresh rate, Rs, or a sparkle rate S. The refresh rate Rs and sparkle rate S are rates at which the displayable objects are processed by the computing resources for display of the objects 109, 110 on devices, such as the client 124. When the virtual resource conserver 102 slows down one of the rates, then the quality of the object as rendered or displayed ("display quality") is reduced. For example, the refresh rate Rs or the sparkle rate S can be a function of a clock cycle rate (t1) of a processor clock 130 on the server 128. The refresh rate Rs or the sparkle rate S can also be a function of the data transfer rate (DT) 132, or the rate at which data that makes up the objects 109, 110 is transferred over the communication network 122 between the server 128 and the client 124. Further, the refresh rate Rs or the sparkle rate S, can also be a function of a clock cycle rate (t2) of a processor clock 134 on the client 124. The clock cycle rates (t1, t2), in some examples, affect rates of action, such as refresh rates, sparkle rates, rates of movement, and so forth.

The virtual resource conserver 102, in stage "2", selects a resource conservation setting for any one of the objects 109, 110 in the virtual universe 101 to respond to the indicator. For example, the objects 109, 110 are smart, or intelligent, in that they have "built in" resource conservation settings ("conservation settings") that can respond to the indicators on the network that indicate an opportunity to conserve resources. The conservation settings for the objects 109, 110 could be stored in the database 131 in records that correspond to the objects 109, 110. In another embodiment, conservation settings for an object are defined in the object and exported or pushed to clients. In another embodiment, a conservation setting is generic to objects or a category of objects and utilized for a group or category of objects. The smart objects 109, 110 can include more than one setting, or levels of settings, that indicate degrees to which the display quality of the smart objects 109, 110 can be reduced.

The virtual resource conserver 102, in stage "3", reduces a display quality of the smart objects 109, 110. For example, the smart objects 109, 110 recognize an indicator that the memory usage 118 and/or the processor usage 119 on the client 124 are near a maximum. Consequently, the virtual resource conserver 102 reduces a refresh rate of the object 109 or a sparkle rate of the object 110, thus reducing the display quality of the displayable characteristics of the objects 109, 110. The virtual resource conserver 102 can reduce the rates by selecting and activating instructions that reduce displayable characteristics. For example, the client 124 may have code used to display a perspective of the virtual universe 101 on the client 124. The code includes subroutines (e.g., functions, methods, procedures, event handlers, etc.), to determine how displayable characteristics of the objects 109, 110 are processed and rendered by the client 124. The subroutines include parameters, or variables, that receive arguments, or values. The arguments are passed when the subroutine is called. For instance, the code may utilize a default argument to maintain the sparkle characteristic 111 on the sparkling object 110 at a high display quality. Likewise, the code may utilize a default argument to maintain the texture of the avatar object 109 at a high display quality. The virtual resource conserver 102, however, could pass an alternative, or modified, argument, different from the default argument, to specific subroutines, which would affect the display quality of the sparkle characteristic 111 on the sparkling object 110 and/or the texture of the object 109. The resource conservation settings on the smart objects 109, 110 could include references to the subroutines and parameters, as well as one or more alternative argument values, so that the virtual resource conserver could refer to, and utilize, the proper subroutines with the alternative arguments.

In some instances, the virtual resource conserver 102 replaces a display of the objects 109, 110, with substitute, reduced quality images. The reduced quality images may resemble the original image of the objects 109, 110. On the other hand, the reduced quality image may be a placeholder image that does not represent the original image, but generically represents the objects 109, 110. The placeholder image could be related to categories, such as all animated objects are replaced with a triangle, whereas all inanimate objects are replaced with circle.

The virtual resource conserver 102, in stage "4", reduces usage of one or more computing resources, such as memory usage or processor usage, on the client 124 or on the server 128. The virtual resource conserver 102 reduces usage of the computing resources both directly and indirectly. For instance, the virtual resource conserver 102 can directly cause the clock 130 on the server 128 or the clock 134 on the client 124, to slow down. By slowing the clocks 130, 134, the virtual resource conserver 102 could cause a temporal dilation, which can affect a refresh rates and action rates of objects in the virtual universe 101. Likewise, the virtual resource conserver 102 could reduce the data transfer rate (DT) 132, which could also cause a temporal dilation in the virtual universe 101. As a result of directly reducing usage of computing resources, the virtual resource conserver 102 indirectly causes reduction of the display quality of the objects 109, 110. The virtual resource conserver 102, however, can also indirectly reduce usage of computing resources. For example, as described in stage "2", the virtual resource conserver 102 reduces display quality of the smart objects 109, 110, such as by directly passing alternative arguments, the result being that the computing resources do not have to work as hard. Thus, the virtual resource conserver 102 indirectly causes computing resources to reduce in usage. In yet other examples, the virtual resource conserver 102 could directly and indirectly reduce usage of computing resources, such as by directly slowing processor or memory usage (e.g., causing temporal dilation, causing overall display degradation), and by using the smart objects 109, 110 to directly reduce display quality, which indirectly reduces usage of computing resources.

The virtual resource conserver 102 could reallocate conserved computing resources to solve performance problems in the virtual universe operating environment 100. If the virtual universe operating environment 100 is experiencing performance problems in an area of the virtual universe 101, then the virtual resource conserver 102 could utilize the conserved computing resources to address the performance problem.

In other examples, users can volunteer to utilize the smart objects 109, 110. For instance, the user could manually enable a user account setting indicating that the user agrees to utilize the smart objects 109, 110. The virtual resource conserver 102 reads the user account setting and accordingly enables the smart objects 109, 110, such as by updating the conservation settings for the smart objects 109, 110. The enabled conservation settings indicate that the objects 109, 110 are in "conservation" mode, and, therefore, the virtual resource conserver 102 is authorized to reduce the display quality of the objects 109, 110.

To incentivize users of the virtual universe 101 to conserve computing resources, the virtual resource conserver 102 can reward users of the virtual universe 101 who use smart objects. For instance, the virtual resource conserver 102 could provide a user's virtual universe user account, or an avatar associated with the user, with a reward, such as special privileges, points, virtual currency, discounts, access to restricted functions, increased display quality to some objects, better performance, increased bandwidth, etc.

In the examples described above, the smart objects 109, 110 were reduced in display quality to conserve computing resources. Alternatively, energy-efficient objects may be rendered or displayed with lower display quality as a default. Users of the virtual universe may then "upgrade" the display quality of objects by paying a fee or performing a service. The virtual resource conserver 102 could update conservation settings of the smart objects 109, 110, to look at a user's account for indicators whether the user has paid the fees or performed the server, to be exempted from display quality reduction.

Example Operating Environments

This section describes example operating environments and networks and presents structural aspects of some embodiments. More specifically, this section includes discussion about virtual resource conserver operating environments and virtual resource conserver architectures.

Example of Preparing a Virtual Object with Resource Conservation Settings

Figure 2:
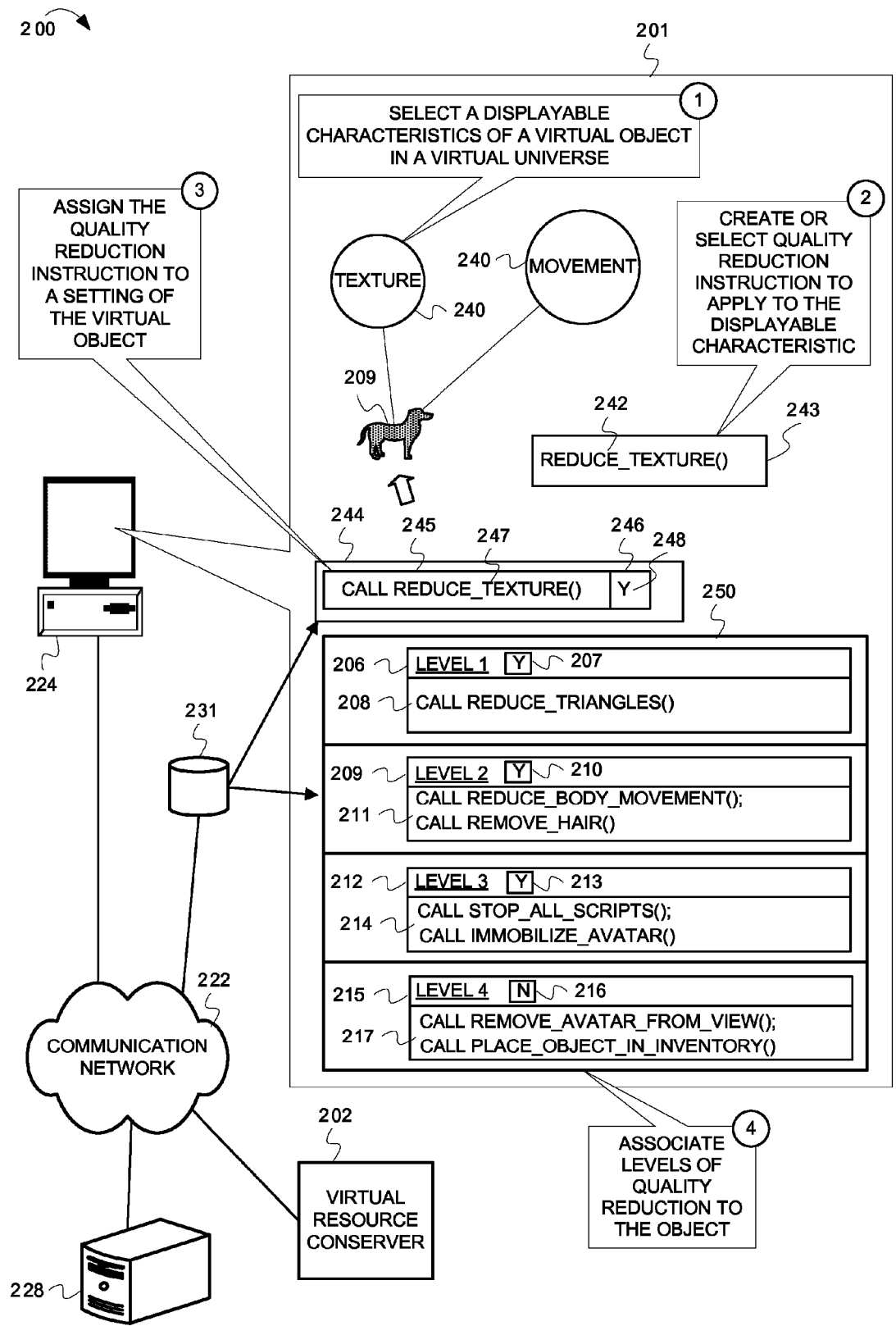
FIG. 2 is an example illustration of preparing a virtual object with resource conservation settings.

FIG. 2 is an example illustration of preparing a virtual object with resource conservation settings. In FIG. 2, an operating environment 200 includes a virtual resource conserver 202 connected to a communication network 222. A server 228 is also connected to the communication network 222. A client 224 is connected to the communication network 222 and processes data, provided by the server 228 or generated by the client 224, to display a perspective of a virtual universe 201. A database 231 is connected to the communication network 222.

The virtual universe 201 contains an object 209. The object 209 possesses displayable characteristics, abilities and/or properties, which define how the object 209 acts and/or appears in the virtual universe 201. For example, the object 209 could be a pet avatar that belongs to a virtual universe resident. The object 209 is created by a manufacturer of objects in the virtual universe 201. When created, the object 209 is assigned one or more displayable characteristics 240 (e.g., functionality, properties, etc.), as well as metadata and settings (e.g., a unique universal identification (UUID)). The assigned displayable characteristics 240, metadata, and settings define the object 209 and permit it to function in the virtual universe 201. As part of the creation process, or any time thereafter, the object 209 can be made into a smart object by assigning one or more conservation settings 244 that store metadata concerning when, how, or to what degree, to reduce a display quality of the object 209.

The virtual resource conserver 202, in stage "1", selects the one or more displayable characteristics 240 of the object 209. For example, the virtual resource conserver 202 selects the one or more displayable characteristics 240 by referencing one or more entries in the database 231 that store information about the object 209. In another example, the virtual resource conserver 202 selects the one or more displayable characteristics 240 by referring to code, such as subroutines, that control or define the displayable characteristics 240. In yet another example, the virtual resource conserver 202 selects the one or more displayable characteristics 240 by utilizing a graphical user interface that refers to the database entry or code. The displayable characteristics 240 can be one of many different characteristics of the object 209 including texture, movement, color, object effects, luminosity, location, etc.

The virtual resource conserver 202, in stage "2", determines a quality reduction instruction 242 to associate with a conservation setting 244. The virtual resource conserver 202 can subsequently utilize the quality reduction instruction 242 to reduce the display quality of the selected displayable characteristics 240 of the object 209. The quality reduction instruction 242 can include subroutines, statements, variables, expressions, operators, arguments, values, constants, arrays, etc., that, when activated or applied, reduce a display quality of the selected displayable characteristics 240. For example, the quality reduction instruction 242 could include state-based logic that recognizes and reacts to the state of a computing resource, such as in a proportional manner to a usage of the computing resource. For instance, as the usage for the computing resource rises above a pre-determined value, the quality reduction instruction 242 proportionally reduces the display quality of the displayable characteristics 240. The quality reduction instruction 242 can be created and stored in, or selected from, a code repository 243, such as a file, a script, a data library, a database record, etc.

In stage "3", the virtual resource conserver 202, associates the quality reduction instruction 242 with the conservation setting 244 for the object 209. For instance, the virtual resource conserver 202 could create one or more records or entries in the database 231 that together comprise the conservation setting 244. For instance, the virtual resource conserver 202 could select, or create, a column 245 in the database 231, and insert a reference 247 to the quality reduction instruction 242. The virtual resource conserver 202 could also select, or create, a column 246 and insert a setting value 248 to indicate whether the conservation setting 244 is enabled.

Further, the virtual resource conserver 202, in stage "4", associates levels 250 of quality reduction instructions to the object 209. For instance, the levels 250 represent degrees of quality reduction, which can also be stored in the database 231 in database columns. The levels 250 are associated with the conservation setting 244. For instance, the levels 250 can be stored in a record of the database 231. This record is related to, and consequently also comprises, the conservation setting 244. The levels 250 can be assigned according to an agreed-upon standard of levels for smart objects, or can be a customized set of levels. A first level 206 could include a first reference 208 to one or more quality reduction instructions that reduce a number of triangles devoted to render an avatar's body. A second level 209 could provide further display quality reduction via a reference 211 to one or more quality reduction instructions that would reduce body movements of the object 209 and remove some display characteristics, like body hair, color, etc. A third level 212 could provide even further display quality reduction via a reference 214 to one or more quality reduction instructions that can stop all scripts and immobilize the object 209. A final fourth level 215 could provide yet further display quality reduction via a fourth reference 217 to one or more quality reduction instructions that can remove the object 209 entirely from the virtual universe 201, or by placing the object 209 in an avatar's inventory. The levels 250 represent a gradual reduction of display quality that the virtual resource conserver 202 can apply to the object 209 when the opportunity arises to conserve computing resources. The gradual reduction of display quality can correlate to a degree of usage of a computing resource. For example, the virtual resource conserver 202 can activate the levels 250, according to their gradual order, to maintain a computing resource below levels of usage that would cause performance degradation in the virtual universe 201. For instance, as a computing resource approaches a maximum usage level, the virtual resource conserver 202 could cause the object 209 to activate the first level 206, which could cause the computing resource usage to stabilize. However, as a busy period increases the usage of the computing resource, the virtual resource conserver 202 could activate the second level 209, and so forth, to continue to stabilize the computing resource. The levels 206, 209, 212, and 215 can also have respective setting values 207, 210, 213, and 216. The virtual resource conserver 202 can enable the conservation settings (e.g., per user request, per administrator request, etc.) to authorize which levels the virtual resource conserver 202 can apply.

FIG. 2 describes associating information to a conservation setting 244 of an object 209 that can be used to reduce the display quality of the object. In some examples, however, the virtual resource conserver 202 assigns information to the resource conservation setting 244 that can be used to increase, or augment, a display quality of the object 209. For instance, in some examples the virtual resource conserver 202 could update the conservation setting 244 of the object 209, to utilize a quality augmentation instruction or value that can be used to improve the display quality of the object 209 from a degraded quality state to an improved quality state. The degraded quality state may occur because the virtual resource conserver 202 caused the object 209 to be reduced in display quality, such as via using a quality reduction instruction or value, to reduce resource usage when resources were busy. On the other hand, the degraded quality state may occur because the virtual resource conserver 202 sets the objects 109 to a reduced quality state as a default, to minimize usage of computing resources. A user account that uses the object 109, however, may have "upgraded" their status, (e.g., paid a fee, performed a service, etc.) so that when the client 224 processes the virtual universe 201, the virtual resource conserver 202 reads the user accounts settings and determines that the user account is an "upgraded" account. Consequently, the virtual resource conserver 202 looks at the resource conservation setting 244 for information that can be used to augment the display quality of the object 209. The virtual resource conserver 202 then augments the display quality of the object 209 by applying quality augmentation instructions or values stored within the setting 244.

Figure 3:
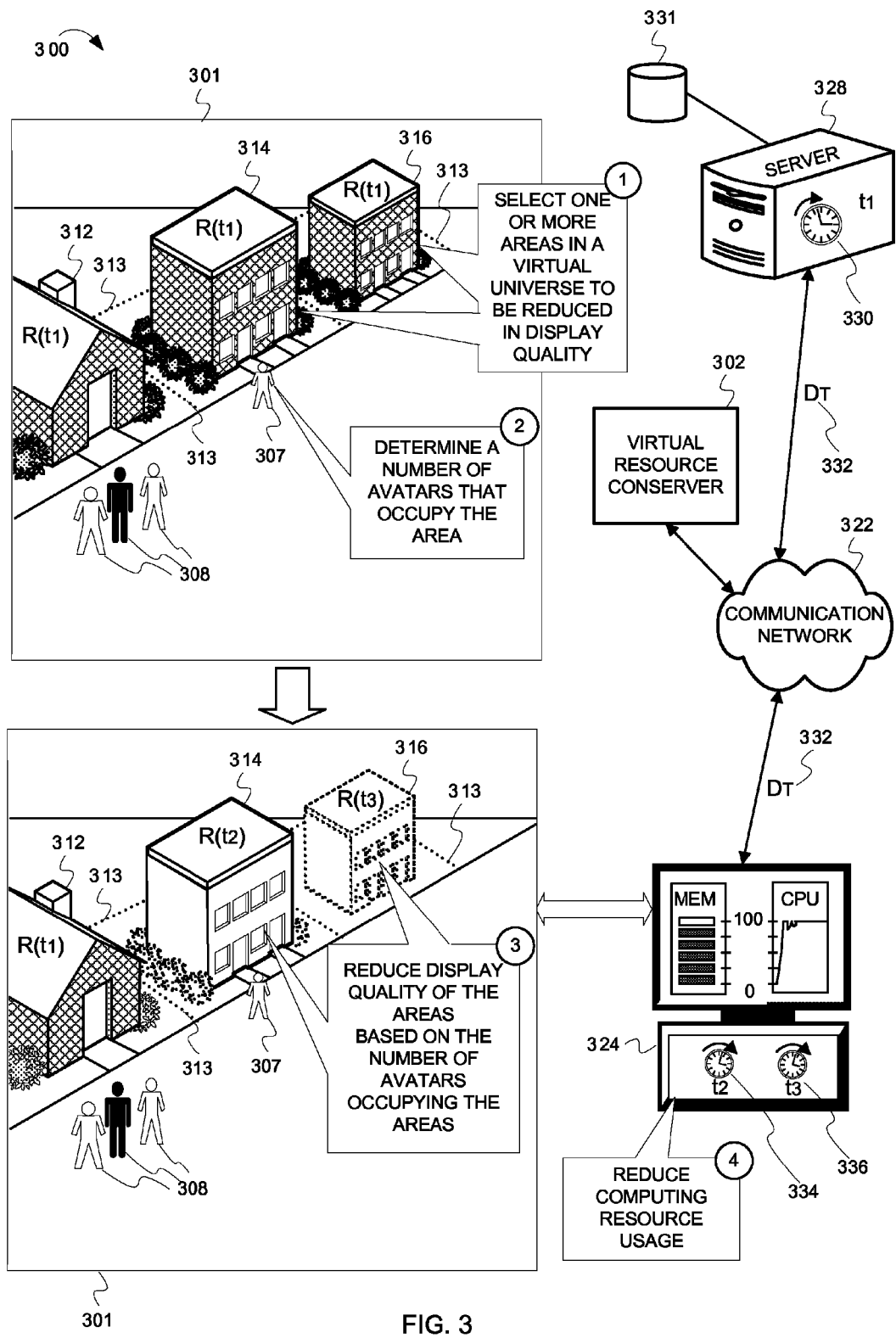
FIG. 3 is an example illustration of modifying a display of an area based on a number of avatars in the area to conserve computing resources.

Example of Modifying a Display of an Area Based on a Number of Avatars in the Area to Conserve Computing Resources FIG. 3 is an example illustration of modifying a display of an area based on a number of avatars in the area to conserve computing resources. In FIG. 3, an operating environment 300 includes a virtual resource conserver 302 connected to a communication network 322. A server 328 is connected to the communication network 322. A client 324 is also connected to the communication network 322. The server 328 hosts a virtual universe 301. A database 331 is connected to the server 328, although the database 331 could also be connected to the communication network 322. All network devices described in conjunction with FIG. 3, such as the server 328, the communication network 322, and the client 324, may be referred to as computing resources. Further, all components with limited availability within the devices, such as processors, memory, disk space, etc., are also computing resources.

The virtual universe 301 contains one or more areas, such as a first area 312, a second area 314, and a third area 316. The areas 312, 314, 316 may have unseen boundary lines 313. The boundary lines 313 may be predetermined and may correlate to boundaries where one computing resource's domain ends and another begins. The boundary lines 313 could correlate to virtual real-estate property boundaries. Further, the virtual resource conserver 302 may generate the boundary lines 313 according to logical rules for determining areas. Each area 312, 314, 316 comprises one or more objects, such as buildings, landscaping, sidewalks, etc. The one or more objects have displayable characteristics, such as textures, colors, actions, etc. The first area 312 has multiple avatars 308 occupying the area 312. The second area 314 has one avatar 307 occupying the area 314. The third area 316 has no avatars occupying the area 316. The areas 312, 314, 316 may have a refresh rate (Rt1) related to a clock cycle rate (t1) of a processor clock 330 on the server 328. The refresh rate (Rt1) relates to a default display quality of the one or more objects in the areas 312, 314, 316. Other functions and operations, such as a data transfer rate (DT) 332, or other rates controlled by the network devices, can also affect the default display quality of the areas 312, 314, 316.

The virtual resource conserver 302, in stage "1", selects one or more areas, such as the areas 312, 314, 316, to potentially reduce in display quality. For example, the virtual resource conserver 302 may look at the computing resources that are used to display the virtual universe 301. If those computing resources are experiencing performance issues, inefficiency, or over usage, the virtual resource conserver 302 may select all areas under the computing resources' control to determine whether, and to what degree, some displayable characteristics may be reduced in display quality to conserve some of the computing resources.

The virtual resource conserver 302, in stage "2", determines and evaluates one or more significance of use factors ("significance factors") to determine whether, or to what degree, to reduce display quality of the areas 312, 314, 316. Significance factors are information, conditions, or characteristics relating to the nature of an activity in, or a purpose for, an area in the virtual universe. For example, the virtual resource conserver 302 determines that a number of avatars that occupy the areas, ("avatar population") will serve as a significance factor. The virtual resource conserver 302 can determine that an avatar occupies an area if the avatar is in, or is in close proximity to, the area. Based on the number of avatars, the virtual resource conserver 302 can calculate a degree, or amount, that it can reduce the display quality for the area. For instance, the virtual resource conserver 302 determines that no avatars occupy the third area 316, thus the virtual resource conserver 302 may decide to significantly reduce the display quality of the area 316. The virtual resource conserver 302 determines that one avatar 307 occupies the second area 314, thus the virtual resource conserver 302 may decide to moderately reduce the display quality of the second area 314, although not as much as the third area 316. The virtual resource conserver 302 determines that many avatars 308 occupy the third area 312, thus the virtual resource conserver 302 may decide to not reduce the display quality of the area 312. In some examples, the virtual resource conserver 302 can use the significance factors to determine the areas to select in stage "1". In other words, stage "2" may precede as well as follow stage "1", or may be performed at the same time as stage "1". For instance, the virtual resource conserver 302 can patrol computing resources in the operating environment 300, as part of a resource conservation plan. The virtual resource conserver 302 would look specifically for areas that can be reduced in display quality, even though the computing resources controlling those areas may not be experiencing performance issues. The virtual resource conserver 302 could analyze areas in light of display quality reduction criteria (e.g., significance factors), and then select the areas based on the analysis.

Other factors for determining whether, or to what degree, to reduce display quality of the areas could include whether the activity in the area has been flagged as being important, if the activity is sponsored or scheduled, if the activity has a strong monetary importance, or if the area has a significance that relates strongly to a goal or purpose of the virtual universe 301. Examples of significant or important activities and/or purposes include a sponsored music concert, a public information kiosk, a dangerous trap, or a treasure.

The virtual resource conserver 302, in stage "3", reduces the display quality of the selected area or areas based on the evaluated significance factors. For instance, because the virtual resource conserver 302 calculated that no avatars were occupying the third area 316, the virtual resource conserver 302 significantly reduces the display quality of the third area 316. The virtual resource conserver 302 removes landscaping and other insignificant objects. The virtual resource conserver 302 reduces the image quality of the building in the third area 316 to have an outline, or frame, but displays little or no detail. The virtual resource conserver could also consider the number of avatars in nearby areas. For example, if there were no avatars occupying the second area 314, which is adjacent to the third area 316, the virtual resource conserver 302 may have entirely removed the image of the building from the third area 316 as it is a far distance from an area with any avatars (e.g., the first area 312). In one example, the virtual resource conserver 302 may remove the objects from the third area 316 simply because there are no avatars occupying the third area 316 (e.g., formulaically, zero avatars would equate to zero display quality, hence the virtual resource conserver 302 would remove the display of all objects in the area).

The virtual resource conserver 302 reduces the display quality of the second area 314, although not as much as the third area 316 because the second area has one avatar 307 occupying the second area 314. The virtual resource conserver 302 reduces the display quality of the second area 314 by reducing the display quality of unimportant displayable characteristics, such as by removing textures or colors from the façade of the building, and minimizing the view of the landscaping. However, the virtual resource conserver 302 maintains a well defined structure to important displayable characteristics of some objects, like the building, entry ways, and sidewalks, so that the avatar 307 can use the building without hindrance or confusion. Some of the objects in the areas 316, 314 and 312, can be smart objects. Also, the virtual resource conserver 302 can gradually reduce the display quality of the areas 312, 314, 316 based on evaluated significance factors. For instance, as significance factors change, the virtual resource conserver 302 can adjust the display quality to compensate for the changes. For example, as a computing resource degrades in performance, or as a computing resource becomes busier or over used, the virtual resource conserver 302 can gradually reduce display quality of the areas 312, 314, 316 to maintain computing resources below a specific level of usage.

The virtual resource conserver 302, in stage "4", reduces computing resource usage. For instance, regarding the third area 316, the refresh rate R(t1), can be a function of the clock rate (t1) on the server 328. Consequently, virtual resource conserver 302 could reduce usage of the processor clock 330 on the server 328, to a different rate (e.g., t3), which would cause the refresh rate on the third area 316 to be reduced, thus reducing display quality of the third area. The virtual resource conserver 302 could instead use a clock rate from the client 324, such as clock rate (t3) related to a clock cycle rate of a processor clock 336 on the client 324, to process the refresh rate R(t3) on the third area 316. Consequently, the virtual resource conserver 302 could reduce usage of the processor clock 336 on the client 324, thus reducing display quality of the third area 316.

Referring to the second area 314, the virtual resource conserver 302 could use a clock rate from the client 324, such as clock rate (t2) related to a clock cycle rate of a second processor clock 334 on the client 324, to process the refresh rate R(t2) on the second area 314. The virtual resource conserver 302 could reduce usage of the processor clock 334, thus reducing the display quality of the second area 314.

In another example, the virtual resource conserver 302 could reduce the data transfer rate (DT) 332 of data used to display the virtual universe 301. For instance, the virtual resource conserver 302 could throttle data, or cause the server 328 to throttle data, to reduce the display quality of the third area 316 or the second area 314.

The examples described so far in conjunction with FIG. 3 have described how a virtual resource conserver 302 reduces display quality of areas. The areas 312, 314, 316 start out with a detailed view. Then, the virtual resource conserver 302 reduces the display quality of the areas 312, 314, 316, based on evaluated significance factors. However, the virtual resource conserver 302 could, alternatively, increase a display quality of an area, based on evaluated significance factors. For example, the virtual resource conserver 302 could initially present an area with a reduced display quality, but then increase the display quality area based on the number of avatars occupying the area. For example, the virtual resource conserver 302 may reduce the display quality of all areas that do not have avatars so that the area would have the display quality similar to the third area 316 as shown in stage "3".

However, as an avatar approaches the area, the virtual resource conserver 302 may increase the display quality of the area. If more avatars occupy the area, then the virtual resource conserver 302 could increase the display quality until the area has no reduction in display quality. Mentioned previously in FIG. 1, the virtual resource conserver 302 can reward and compensate users of the virtual universe 301 that use smart objects. One of the ways that the virtual resource conserver 302 could reward users of the virtual universe 301 would be to provide views that are not reduced in display quality. Furthermore, additional significance factors that the virtual resource conserver 302 could evaluate could include whether the user that controls the avatars 307, 308 has volunteered to experience reduced views.

Figure 4:
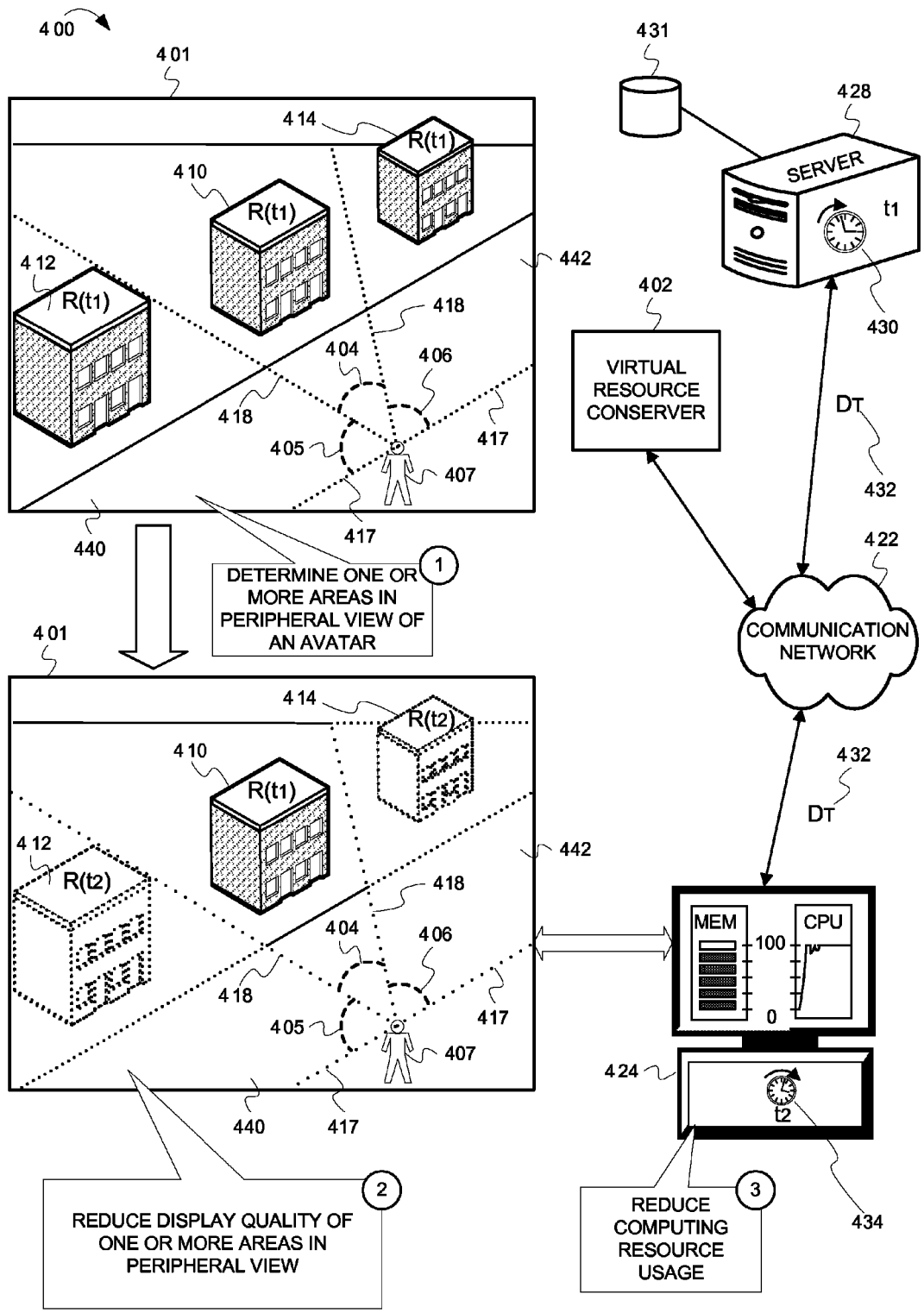
FIG. 4 is an example illustration of modifying a view of an area based on an avatar's perspective to conserve computing resources.

Example of Modifying a View of an Area Based on an Avatar's Perspective to Conserve Computing Resources FIG. 4 is an example illustration of modifying a view of an area based on an avatar's perspective, to conserve computing resources. In FIG. 4, an operating environment 400 includes a virtual resource conserver 402 connected to a communication network 422. A server 428 is connected to the communication network 422. A client 424 is also connected to the communication network 422. The server 428 hosts a virtual universe 40. A database 431 is connected to the server 428, although the database 431 could also be connected to the communication network 422. All network devices described in conjunction with FIG. 4, such as the server 428, the communication network 422, and the client 424, may be referred to as computing resources. Further, all components with limited availability within the devices, such as processors, memory, disk space, etc., are also computing resources.

The virtual resource conserver 402, in stage "1", determines one or more areas 440, 442 in a peripheral view of an avatar 407. In one example, the virtual resource conserver 402 determines areas 440, 442 in a peripheral view of the avatar 407 by first determining the avatar's direct field of vision marked by a first set of boundary lines 418 and an angle of direct view 404. The virtual resource conserver 402 can determine the angle of direct view 404 based on multiple criteria. For instance, if the avatar 407 is engaged in an activity that requires a wider direct field of vision, such as fighting a battle, seeking an item or hunting a creature, shopping for virtual real estate, etc., then the virtual resource conserver 402 can increase the angle of direct view 404 to be sufficiently wide. Wide angle views may be referred to as "broad interest" views. In other examples, if the avatar 407 is engaged in an activity that does not require a wider direct field of vision, such as engaging in a one-on-one conversation, playing a video game, observing a single object, waiting for a virtual item to respond, etc., then the virtual resource conserver 402 can decrease the angle of direct view 404 to be fairly narrow. Such narrow angle views may be referred to as "narrow interest" views.

A second set of boundary lines 417 can indicate areas that are in front of the avatar, which are potentially viewable by the avatar 407 within the virtual universe 401. Although the boundary lines 417 are shown in FIG. 4 as a straight line, the boundary lines 417 could be curved or set at an angle, depending on the display capabilities of the virtual universe 401. Consequently, the virtual resource conserver 402 determines that any area in front of the second boundary lines 417, but outside of the first boundary lines 418, are areas 440, 442 in the avatar's peripheral view. The areas 440, 442 will be referred to as "peripheral view areas." The peripheral views areas 440, 442 therefore comprise the areas measured from the first boundary lines 418, through the angles of peripheral view 405, 406, until reaching the second boundary line 417.

The virtual resource conserver 402, in stage "2", reduces the display quality of the one or more peripheral view areas 440, 442. The objects, such as buildings 412 and 414, within the peripheral view areas 440, 442, can be reduced in display quality by removing textures, colors, actions, movements, etc. In one example, the virtual resource conserver 402 changes the refresh rate (t1) for the peripheral view areas 440, 442 so that in stage "2", the refresh rates for the peripheral view areas 440, 442 have changed to a second, slower refresh rate (t2), thus reducing the display quality of the peripheral view areas 440, 442. In one example, the virtual resource conserver 402 could determine that any one of the peripheral views 440, 442 should not be reduced in display quality. For example, if an important activity is occurring in the area 442, the virtual resource conserver 402 may decide not to reduce the display quality of that area 442, and instead only reduce the area 440. In other words the angle of peripheral view 406 would become part of the angle of direct view 404, so that the boundary line 418 over lays the boundary line 417.

The virtual resource conserver 402, in stage "3", reduces usage of computing resources. For example, the virtual resource conserver 402 reduces display quality by reducing the use of computing resources. For instance, the virtual resource conserver 402 could reduce usage of the processor clock 430 on the server 428, to change the clock cycle rate (t1) to a slower clock cycle rate, which could cause the refresh rate on the peripheral view areas 440, 442 to be reduced. The virtual resource conserver 402 could instead reduce the clock rate (t2) of processor clock 434 on the client 424. In another example, the virtual resource conserver 402 could reduce the data transfer rate (DT) 432 of data used to display the virtual universe 401. For instance, the virtual resource conserver 402 could throttle data, or cause the server 428 to throttle data, to reduce the display quality of the peripheral view areas 440, 442. By reducing the clock cycle rates and data transfer rates, the virtual resource conserver 402 can reduce computer resource usage.

In some examples, users of the virtual universe 401 can volunteer to experience limited views. The virtual resource conserver 402 can reward users for volunteering to experience limited views by providing rewards to user accounts or avatars associated with users. In other examples, the virtual resource conserver 402 can impose limited views upon users as part of a resource conservation plan.

Figure 5:
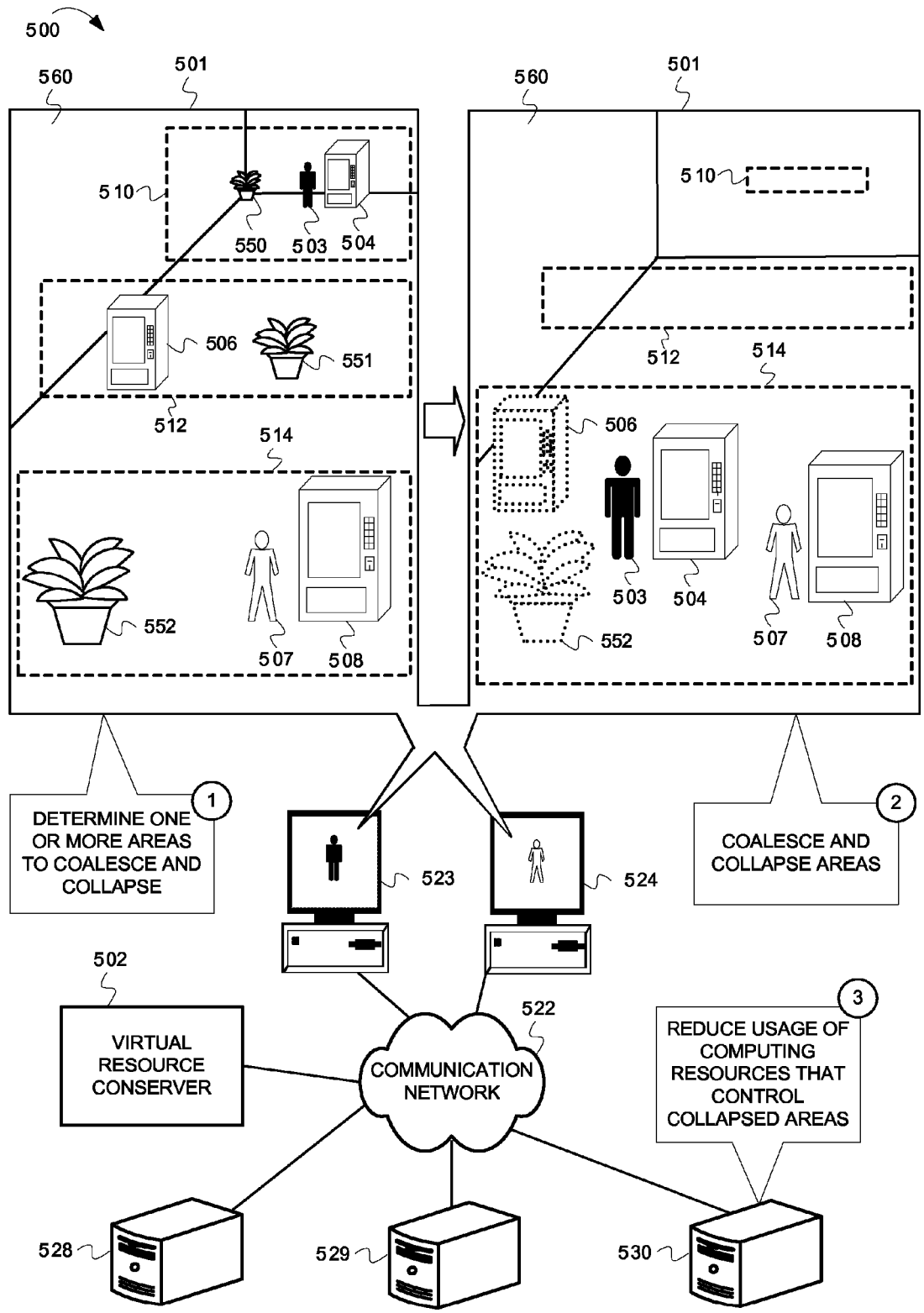
FIG. 5 is an example illustration of coalescing and collapsing areas and computing resources in a virtual universe to conserve computing resources.

Example of Coalescing and Collapsing Areas and Computing Resources in a Virtual Universe to Conserve Computing Resources FIG. 5 is an example illustration of coalescing and collapsing areas and computing resources in a virtual universe to conserve computing resources. In FIG. 5, an operating environment 500 includes a virtual resource conserver 502 connected to a communication network 522. One or more computing resources, such as servers 528, 529, 530, and clients 523, 524 are connected to the communication network 522. A first client 523 controls a first avatar 503 in the virtual universe 501. A second client 524 controls a second avatar 507 in the virtual universe 501. The clients 523, 524 process data, from the servers 528, 529, 530 to respectively render a perspective of the virtual universe 501. The servers 528, 529, 530 can control different areas 510, 512, 514 in a region 560 of the virtual universe 501. In other examples, portions, or sections of a single computing resource (e.g., partitions of a single database, processors of a single server, etc.) could instead control the areas 510, 512, 514 of the virtual universe 501. The portions, or sections, of the single computing resource may be considered as separate computing resources for purposes of this description. The region 560 includes one or more topology objects 550, 551, 552. Topology objects 550, 551, 552 are objects that that give the region 560 a look and feel. The topology objects 550, 551, 552 are useful to give the region 560 a consistent topology. However, topology objects 550, 551, 552 are non-interactive, meaning that the avatars 503, 507 can see them, and possibly touch them, but the topology objects 550, 551, 552 do not meaningfully respond to, or interact with, the avatars 503, 507. The region 560 can also include interactive objects 504, 506, 508. The interactive objects 504, 506, 508 are objects with which the avatars 503, 507 can meaningfully interact. The interactive objects 504, 506, 508 generally relate to a purpose for the existence of the areas 510, 512, 514 in the virtual universe 501. Some examples of interactive objects include reward items (e.g., treasures, scrolls, gifts, etc.) quest related items (traps, monsters, secrets, etc.), interactive avatars (e.g., quest givers, combatants, allies, social contacts, etc.), personal items (e.g., a weapon, a cell phone, a television, etc.), recreational items (e.g., vending machines, video games, puzzles, etc.), and so forth.

The virtual resource conserver 502, in stage "1", determines one or more areas in the region 560 to collapse or coalesce. Coalescing, or combining, an area means to move objects of significance, such as avatars and/or interactive objects, from the area into another area in a region of the virtual universe 501. Avatars that are controlled by a user are usually objects of significance, because the area exists primarily for the avatar's use. Interactive objects are also objects of significance depending on how an avatar is interacting, or could likely interact, with the interactive object. For instance, if an avatar is using the interactive object, then the interactive object is an item of significance. However, if there are a plurality of interactive objects in a area, like a row of identical vending machines, and only one avatar is near the vending machines, but the avatar is not interacting with any of the vending machines, the virtual resource conserver 502 may determine that only one of the vending machines should be considered an object of significance, because the one avatar could potentially interact with one of the vending machines. However, the virtual resource conserver 502 would consider the remainder of the vending machines as non-significant objects. The virtual resource conserver 502 could further analyze whether the avatar is likely to interact with the interactive object. For example, even though an interactive object may be near an avatar, the virtual resource conserver 502 may analyze where the avatar is currently looking, or what the avatar is currently doing. If the avatar is not looking at the nearby interactive object, if the avatar is moving away from the nearby interactive object, or if the avatar is distracted by or using another interactive object, then the virtual resource conserver 502 may consider the nearby interactive object as a non-significant item. Coalescing is performed to clear out an area of significant objects so that the area can be collapsed. Collapsing an area means that after the significant objects are removed from the area, all other non-significant objects (e.g., topology objects) can be removed from display or significantly reduced in display quality, to conserve computing resources. In some embodiments, the entire area can be cropped from the virtual universe 501.

The virtual resource conserver 502 analyzes the first area 510 and determines that the avatar 503 is occupying the area 510. The virtual resource conserver 502 also determines that the avatar 503 interacts with the interactive object 504. Because one or more objects of significance, e.g., the avatar 503 and the interactive object 504, occupy the first area 510, the virtual resource conserver 502, determines that the first area 510 could be coalesced with another area, or that another area could be coalesced with the first area 510.

Because there is an avatar in the first area 510, the virtual resource conserver 502 determines which of the servers 528, 529, 530 controls the first area 510 so that the virtual resource conserver 502 can determine session data used by the first client 523 to control the avatar 503. The virtual resource conserver 502 can subsequently transfer the session data to another computing resource when moving the avatar 503 from the first area 510. For instance, the virtual resource conserver 502 determines that the first server 528 controls the first area 510, or in other words the first server 528 processes data for displaying objects and controlling actions in the first area 510. The first server 528 also processes session data for the first client 523 to control the avatar 503 within the first area 510.

The virtual resource conserver 502 also analyzes the second area 512 and the third area 514. The virtual resource conserver 502 analyzes the second area 512 and determines that there are no avatars in the area 512 and determines that the second area 512 will be collapsed. The virtual resource conserver 502 determines that the second server 529 controls the second area 512. The virtual resource conserver 502 analyzes the third area 514 and determines that the avatar 507 occupies the third area 514, and that the avatar 507 interacts with the interactive object 508. Because one or more object of significance, e.g., the avatar 507 and interactive object 508, occupy the third area 514, the virtual resource conserver 502, determines that the third area 514 could be coalesced with another area, or that another area could be coalesced with the third area 514. The virtual resource conserver 502 determines that the third server 530 controls the third area 514, or in other words, the third server 530 processes data for displaying objects and controlling actions in the third area 514. The third server 530 also processes session data for the second client 524 to control the avatar 507 within the third area 514.

The virtual resource conserver 502 has detected two areas, the first area 510 and the third area 514, which could be coalesced to conserve computing resources. The virtual resource conserver 502 analyzes the computing resources to determine whether coalescing and collapsing the areas would be a savings or efficiency enhancement of computing resource usage. For instance, the virtual resource conserver 502 analyzes information about the servers 528 and 530, and may determines that coalescing the first area 510 and the third area 514 would require more computing resources to coalesce and maintain coalesced than would be saved. For example, if many avatars were occupying and moving in and out of the first area 510 and the third area 514, the virtual resource conserver 502 may determine that coalescing the first area 510 and the third area 514 would be a drain on computing resources. On the other hand, the virtual resource conserver 502 may analyze the server 528 and 530 and recognize other scenarios and metrics that indicate coalescing areas would be efficient and/or beneficial. For instance, the virtual resource conserver 502 may determine (e.g., analyze resources, receive an indication from an administrator, etc.) that some important tasks should be processed by a single computing resource. Consequently, the virtual resource conserver 502 could determine that the first area 510 should be coalesced with the third area 514 so that the virtual resource conserver 502 can use the first server 528 to process the important tasks.

Once determined that there would be a savings or efficiency enhancement of computing resource usage, the virtual resource conserver 502 determines which of the three servers 528, 529, 530 can most efficiently process a single, coalesced area. For instance, the virtual resource conserver 502 determines that the third server 530 can most efficiently process the objects (e.g., the third server 530 is more powerful, the third server 530 is less busy, etc.) and, hence, the virtual resource conserver 502 determines that the first area 510 will be coalesced with, or combined into, the third area 514, and that the first area 510 and the second area 512 will be collapsed.

The virtual resource conserver 502, in stage "2", coalesces and collapses the areas. The virtual resource conserver 502 moves the first avatar 503 to the third area 514. The virtual resource conserver 502 also moves the interactive object 504 to the third area 514 because the first avatar 503 was interacting with the interactive object 504. The virtual resource conserver 502 could move the avatar from the first area 510 to the third area 514 using one or many techniques, such as by using functions built into the virtual universe 501, including teleportation, walk, run, fly, etc. The virtual resource conserver 502 could re-draw and re-map the avatar 503 and the interactive object 504 into the third area 514. The virtual resource conserver 502 could orient the avatar, such as by demonstrating to the avatar 503 where it will be moved before actually moving the avatar 503. The virtual resource conserver 502 may demonstrate to the avatar 503 a proposed path of movement on a map, or with visual indicators, like arrows or lines, that show that movement will occur from a point in the first area 510 to a point in the third area 514. The virtual resource conserver 502 does not move the topology object 550 because it is an unimportant object that is consuming resources without a significant purpose other than to act as landscaping.

The virtual resource conserver 502 collapses the first area 510 by removing a display of the topology object 550, and any other non-significant objects. The virtual resource conserver 502 can remove objects by reducing the display quality of the objects until they are no longer displayed. The virtual resource conserver 502 could remove some objects by moving the objects into an avatar inventory. Many techniques have been described above in conjunction with FIGS. 1 through 4 which the virtual resource conserver 502 could utilize to reduce the display quality of objects. The virtual resource conserver 502 also collapses the second area 512 by removing any topology objects, such as topology object 551, as well as any non-significant objects.

In some embodiments, the virtual resource conserver 502 could cause a reduced display quality image of the interactive object 506, from the second area 512, to appear in the third area 514. This reduced display quality image of the interactive object 506, can be moved, or redrawn with a new image. The virtual resource conserver 502 may move, or redraw, the interactive object 506 into the third area 514 to indicate to other avatars that enter the region 560 that the third area 514 can accommodate other avatars that may want to interact with objects in the region 560. However, the virtual resource conserver 506 reduces the display quality of the interactive object 506 to maximize resource conservation. Once an avatar comes close to the reduced display quality image of the interactive object 506 in the third area 514, the virtual resource conserver 502 could increase the display quality of the interactive object 506. The virtual resource conserver 502 could reduce the display quality of non-significant objects in the third area 514, such as the topology object 552, for additional resource conservation. The physical layout of the third area 514 can change because objects are moved into the third area 514. Plus, the third area 514 can expand, if necessary, to accommodate the first avatar 503, the interactive object 504, and the reduced display quality image of the interactive object 506.

The virtual resource conserver 502, in stage "3", reduces usage of the computing resources that control the collapsed areas. For instance, since the virtual resource conserver 502 moved the avatar 503 from the first area 510 to the third area 514, the virtual resource conserver 502 transfers any session data for controlling the first avatar 503 from the first server 528 to the third server 530. The virtual resource conserver 502 could use a virtual data transfer application or function, like functions provided by VMware®'s VMotion™ software application or IBM®'s Application Mobility software application. Because the virtual resource conserver 502 moved all objects of significance, and removed the display of other objects, from the first area 510 and the second area 512, the virtual resource conserver 502 can cause the first server 528 and the second server 529 to reduce resource usage. Reducing resource usage could include shutting down the servers 528, 529, causing the servers 528, 529 to sleep or hibernate, reducing processor cycles, reducing memory usage, reducing disk usage, etc. In addition, the servers 528, 529 could continue operating on other existing tasks, be assigned different tasks, etc.

In some examples, specific regions in the virtual universe 501 can be designed as energy-efficient regions which use the techniques described herein. The designer of the region can entice energy-conscientious residents to visit the regions by promoting the area as energy-efficient. Avatars that enter energy-efficient regions can expect that areas will be collapsed when not in use, or expanded to accommodate additional avatars. Designers may design the regions to have modular areas, with repetitious topologies, so that areas can be collapsed easily without disorienting avatars.

Further, the examples described in FIG. 4 have shown regions with areas that are contiguous on a horizontal plane. However, other examples could include areas that are non-contiguous, or contiguous on a vertical plane, such as rooms on different floors of a building. For instance, the virtual resource conserver 502 would move one or more avatars from one floor of the building to another floor of the building while coalescing and collapsing areas. The virtual resource conserver 502 could orient the one or more avatars by showing the avatars a map of the building and demonstrating a proposed path of movement on the map.

Example Virtual Resource Conserver Architecture

Figure 6:
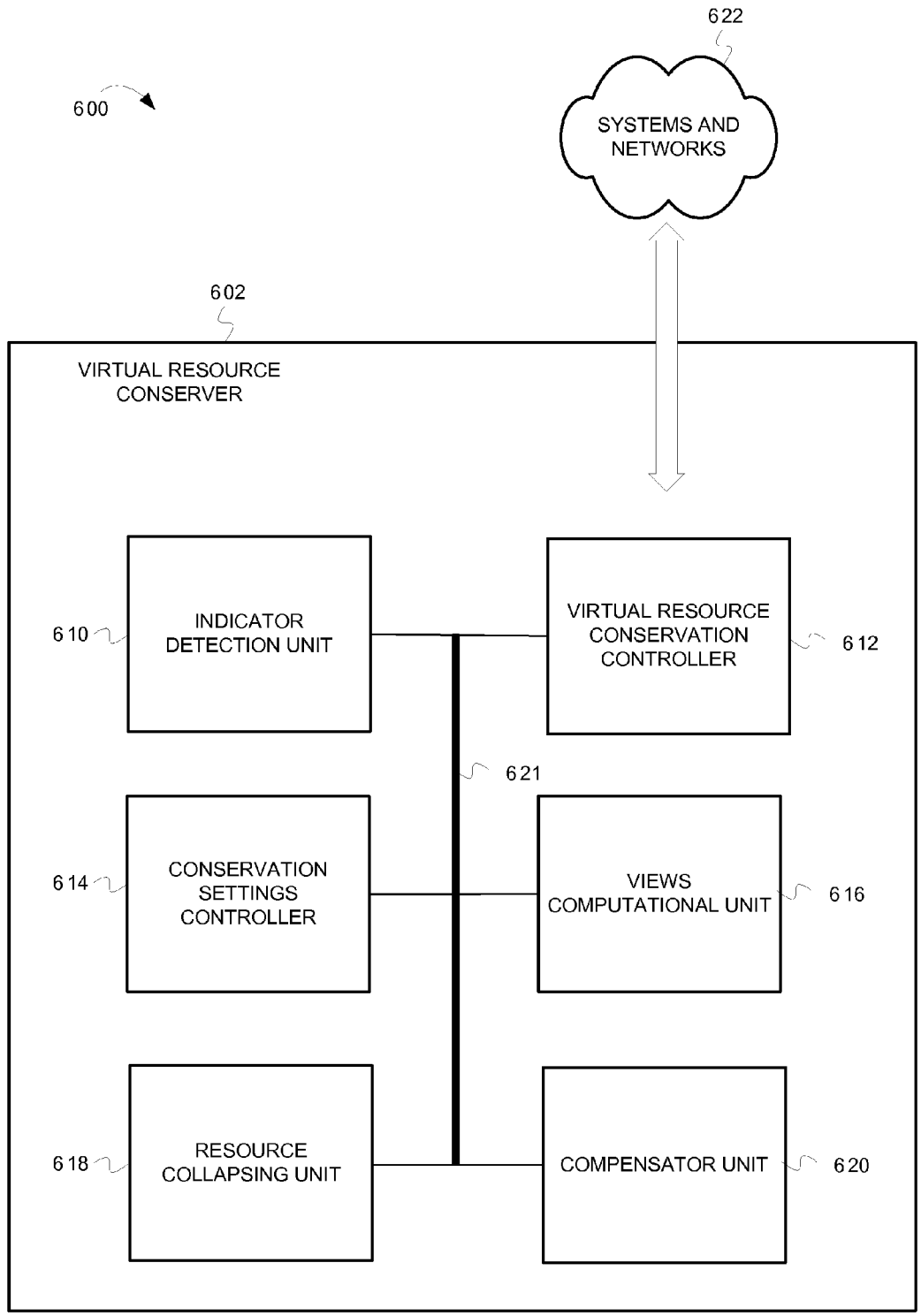
FIG. 6 is an illustration of an example virtual resource conserver architecture 600.

FIG. 6 is an illustration of an example virtual resource conserver architecture 600. In FIG. 6, the virtual resource conserver architecture 600 can include a virtual resource conserver 602 configured to connect to, and interact with, systems and networks 622.

The virtual resource conserver architecture 600 includes an indicator detection unit 610. The indicator detection unit 610 detects data that indicates that a resource conservation setting is to be selected for a virtual object in a virtual universe to reduce usage of a computing resource. For instance, the indicator detection unit 610 detects when a computing resource is overused or experiencing performance issues. The indicator detection unit 610 can also detect when a smart object is enabled, or when an object enters into a resource conservation area.

The virtual resource conserver architecture 600 also includes a virtual resource conservation controller 612 configured to control display quality and positioning of objects and areas in a virtual universe. The virtual resource conservation controller 612 can activate operations that reduce the display quality of an object's displayable characteristics. The virtual resource conservation controller 612 can reduce usage of processors, memory, disks, rendering hardware, communication devices, etc. of a computing device in response to, or in conjunction with, reducing display quality of objects in the virtual universe.

The virtual resource conserver architecture 600 also includes a conservation setting controller 614 configured to configure conservation settings for virtual objects. The conservation setting controller 614 can select, create, and associate quality reduction instructions to reduce the display quality of objects. The conservation setting controller 614 can also enable a resource conservation setting value on an object's related record in a database.

The virtual resource conserver architecture 600 also includes a views computational unit 616 configured to compute displays of views in relation to an avatar's perspective, location or activity in a virtual universe. For instance, the views computational unit 616 can calculate areas pertaining to an avatar's direct field of vision, as well as areas pertaining to an avatar's peripheral view.

The virtual resource conserver architecture 600 also includes a resource collapsing unit 618 configured to collapse areas of a virtual universe and collapse computing resources that control the collapsed areas. The resource collapsing unit 618 can move objects from a first area to a second area, and collapse the first area by reducing computing resource usage and/or reducing a display quality of the first area.

The virtual resource conserver architecture 600 also includes a compensator unit 620 configured to reward virtual universe avatars and user accounts of a virtual universe user for using resource conservation objects and resource conservation techniques in a virtual universe.

The virtual resource conserver architecture 600 also includes a communication interface 621 configured to facilitate communication between the components of the virtual resource conserver 602.

Each component shown in the virtual resource conserver architecture 600 is shown as a separate and distinct element. However, some functions performed by one component could be performed by other components. For example, the virtual resource conservation controller 612 could collapse areas, compute views, compensate virtual universe users, or perform any other operation or processes described in embodiments herein. Furthermore, the components shown may all be contained in the virtual resource conserver 602, but some, or all, may be included in, or performed by, other devices on the systems and networks 622. Furthermore, the virtual resource conserver architecture 600 can be implemented as software, hardware, any combination thereof, or other forms of embodiments not listed.

Example Operations

This section describes operations associated with some embodiments of the invention. In the discussion below, the flow diagrams may be described with reference to the block diagrams presented above. However, in some embodiments, the operations can be performed by logic not described in the block diagrams.

In certain embodiments, the operations can be performed by executing instructions residing on one or more machine-readable storage devices (e.g., software), while in other embodiments, the operations can be performed by hardware and/or other logic (e.g., firmware). Moreover, some embodiments can perform less than all the operations shown in any flow diagram.

Figure 7:
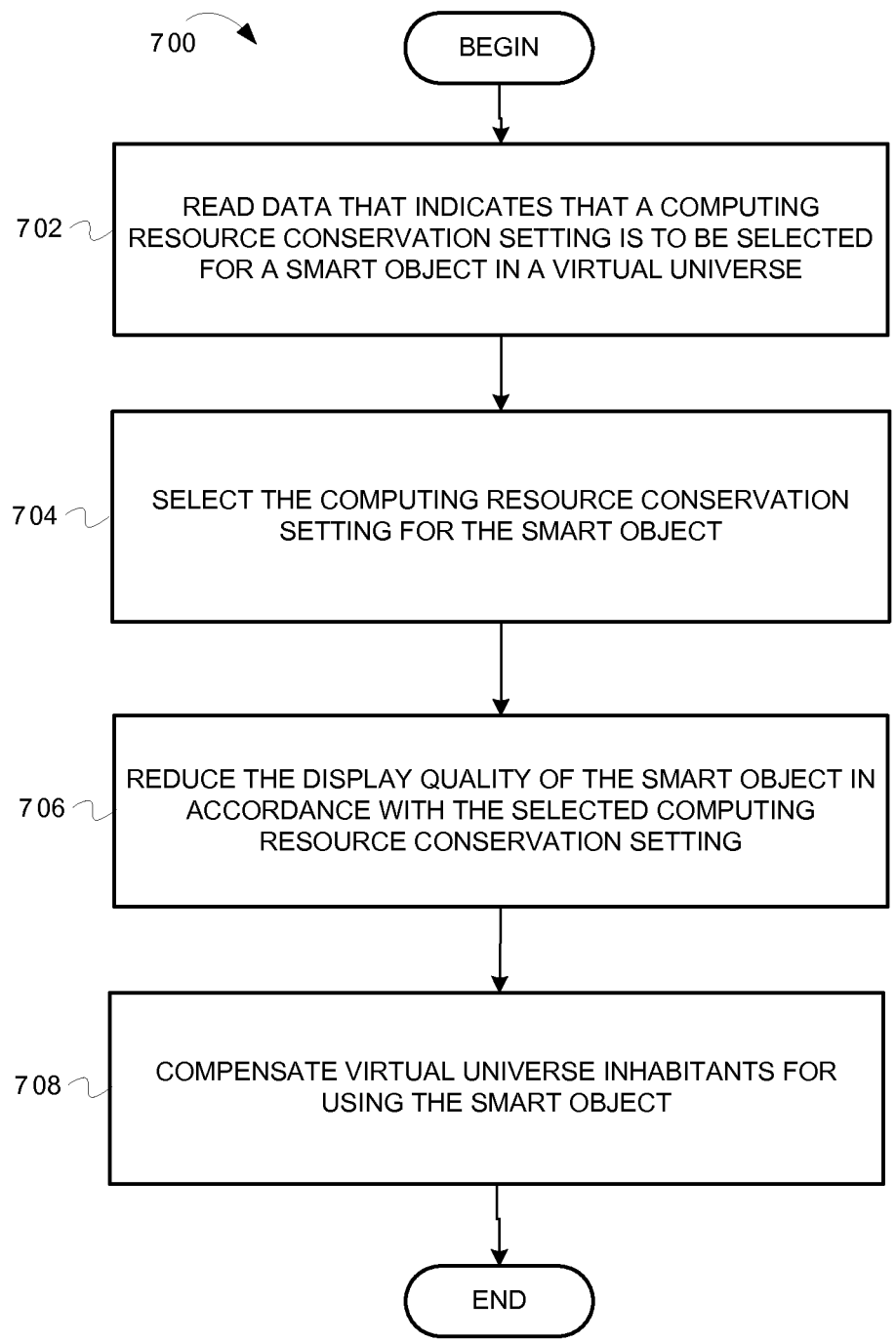
FIG. 7 is an example flow diagram 700 illustrating using smart objects in a virtual universe to conserve computing resources.

FIG. 7 is an example flow diagram illustrating using smart objects in a virtual universe to conserve computing resources. In FIG. 7, the flow 700 begins at processing block 702, where a virtual resource conserver reads data that indicates that a resource conservation setting is to be selected for a smart object in a virtual universe. In one example, the virtual resource conserver detects an indicator that a computing resource is being over used, or that requires a reduction in usage. One such indicator could be that a computing resource, such as a server, is experiencing busy times, poor performance, or usage maximization. The virtual resource conserver queries the virtual universe to determine one or more smart objects that have displayable characteristics, such as actions and properties that can be reduced in display quality. The displayable characteristics can be properties of the object, like texture, color, sparkle, etc. The displayable characteristics can also be actions like movement, communication, travel, etc. The displayable characteristics correspond to functions and operations provided by one or more computing resources, like servers or client machines. The computing resources control property refresh rates and action rates. The virtual resource conserver can reduce the display quality of the smart objects, which in turns reduces usage of the computing resources, or vice versa. The smart objects have resource conservation settings that mark the object as being smart objects. The resource conservation settings include metadata that identifies whether the smart objects can respond to virtual universe conservation indicators, what displayable characteristics can be reduced, and references to code (subroutines, statements, parameters, etc.) that the virtual resource conserver can use to reduce the display quality of the displayable characteristics. The metadata could also include levels that the virtual resource conserver can use, or follow, to reduce the display quality gradually.

The flow 700 continues at processing block 704, where the virtual resource conserver selects the resource conservation setting for the smart object. For instance, the virtual resource conserver selects the metadata associated with the resource conservation setting. In one example, the virtual resource conserver selects the metadata by reading a database entry for the object that stores the metadata.

The flow 700 continues at processing block 706, where the virtual resource conserver reduces the display quality of the smart object in accordance with the selected resource conservation setting. For example, virtual resource conserver reduces the display quality of the object's displayable characteristics using the metadata. In some examples, the metadata contains references to quality reduction instructions that the virtual resource conserver processes to reduce display quality, such as sparkle characteristics, texture, color, movement, etc. of the smart object. The virtual resource conserver processes the quality reduction instructions to reduce usage of one or more computing resources, such as usage of memory, processors, disk space, etc. Thus, the virtual resource conserver conserves energy and power from the computing resources. Further, the virtual resource conserver can reallocate conserved computing resource usage to solve performance issues in the virtual universe. If the virtual universe is experiencing performance problems in an area of the virtual universe, then the virtual resource conserver can utilize the conserved computing resource, such as processing cycles on a server, to address the performance problems.

The flow 700 continues at processing block 708, where the virtual resource conserver compensates a virtual universe user for using the one or more smart objects. To incentivize users of the virtual universe to use smart objects, the virtual resource conserver rewards users of the virtual universe that use smart objects. For instance, the virtual resource conserver could provide rewards to an avatar or a user account belonging to a user of the virtual universe that uses the smart objects. Examples of rewards include special privileges, points, virtual currency, discounts, access to restricted functions, increased display quality to some objects, better performance, increased bandwidth for data transfer, etc.

In some embodiments, the operations can be performed in series, while in other embodiments, one or more of the operations can be performed in parallel. Some operations may be omitted, such as processing block 708 for compensating, or rewarding, virtual universe users.

Figure 8:
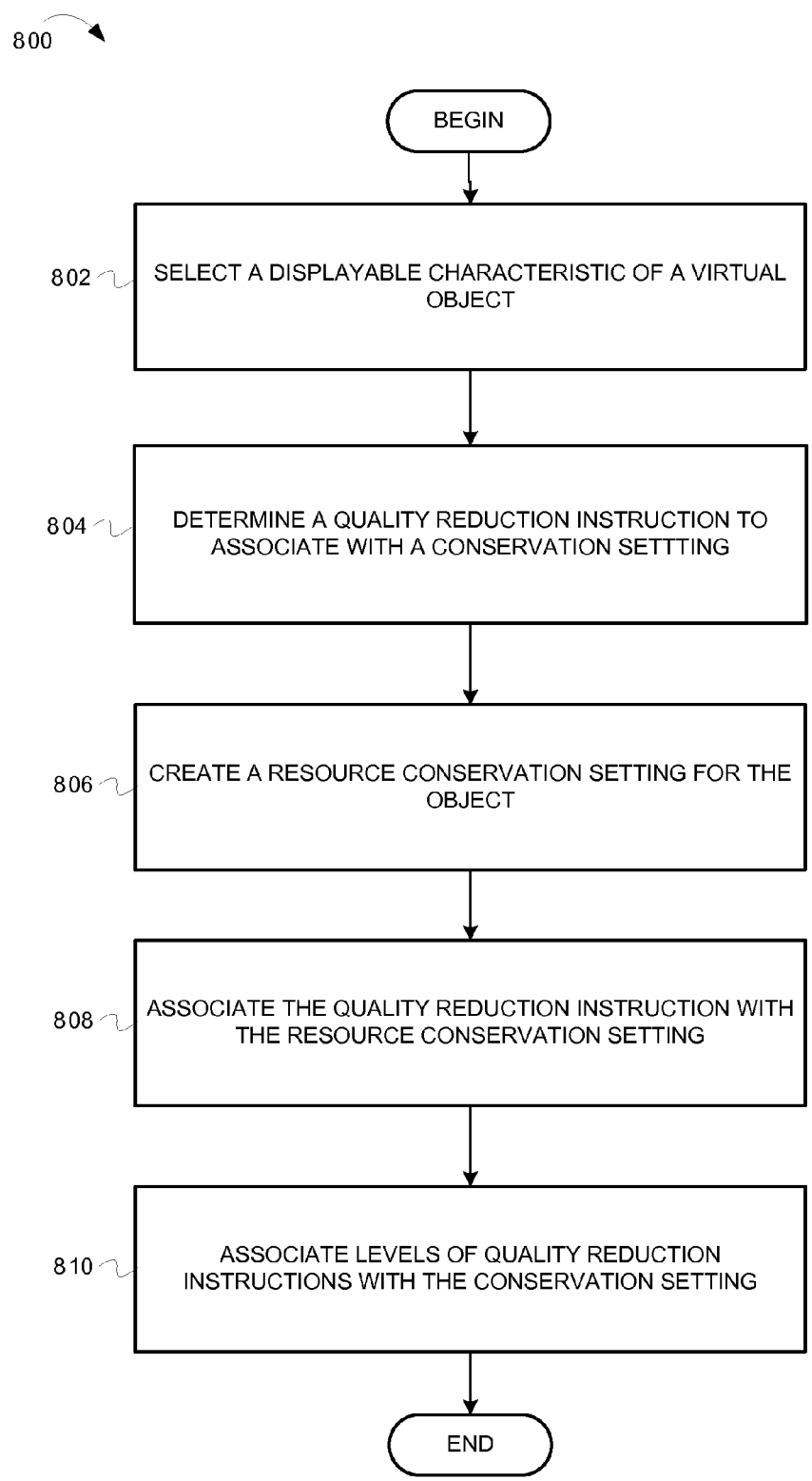
FIG. 8 is an example flow diagram 800 illustrating preparing a virtual object with resource conservation settings.

FIG. 8 is an example flow diagram illustrating preparing a virtual object with resource conservation settings. In FIG. 8, the flow 800 begins at processing block 802, where a virtual resource conserver selects a displayable characteristic of a virtual object. The virtual object possesses displayable characteristics, or abilities and properties, which define how the object acts and appears in the virtual universe. The displayable characteristics were assigned to the object when it was created. The virtual resource conserver, in one example, selects a displayable characteristic of the object by referencing an entry in a database that stores information about the object's characteristics, or by referring to code that controls or defines the objects abilities and characteristics. In other examples, a displayable characteristic can be selected using a graphical user interface that refers to the database entries or to the object's code.

The flow 800 continues at processing block 804, where the virtual resource conserver determines, or creates, a quality reduction instruction to associate with a conservation setting. The virtual resource conserver can subsequently utilize the quality reduction instruction to reduce the display quality of the selected displayable characteristic of the object. The quality reduction instruction can be created and stored in, or selected from, a code repository, such as file, a script, a data library, a database record, etc. The quality reduction instruction can include subroutines, statements, variables, expressions, operators, arguments, values, constants, arrays, scales, etc., that, when activated or applied, reduce a display quality of the selected displayable characteristic. For example, the quality reduction instruction could include state-based logic that recognizes and reacts to the state of a computing resource, such as in a proportional manner to a usage of the computing resource. For instance, as the usage for the computing resource rises above a pre-determined value, the quality reduction instruction proportionally reduces the display quality of the displayable characteristic. The virtual resource conserver could create quality reduction instructions using various programming languages, like C#, Java, etc. The virtual resource conserver could also select pre-written quality reduction instructions. Further, the virtual resource conserver can store and process the quality reduction instruction on a client, a server, or any other computing resource on a virtual universe network that can process computer instructions.

The flow 800 continues at processing block 804, where the virtual resource conserver creates a resource conservation setting for the object. In one example, the virtual resource conserver creates a location for storing the resource conservation setting by creating one or more columns in a database. For instance, the virtual universe includes databases containing one or more tables with one or more records that relate to the object. The one or more records already contain data that characterize the object, such as a UUID, manufacturer information, and data regarding the objects properties and options. Thus, the virtual resource conserver adds columns specifically for storing resource conservation data. The virtual resource conserver can subsequently add data to the one or more columns as setting values, which indicate when, how, and to what degree an object can be reduced in display quality to conserve computing resources.

The flow 800 continues at processing block 804, where the virtual resource conserver associates the quality reduction instruction with the conservation setting for the object. For instance, the virtual resource conserver writes a reference to the quality reduction instruction in one or more columns of a database record related to the object. The columns could, for example, include a reference to a subroutine related to the selected displayable characteristic, as well as pre-determined arguments that the virtual resource conserver can pass into the subroutine which would modify the display quality of the displayable characteristic.

The flow 800 continues at processing block 804, where the virtual resource conserver associates levels of quality reduction instructions with the conservation setting. For instance, a level can include an order of degree of quality reduction, which the virtual resource conserver can store in a database entry. The virtual resource conserver can associate the levels according to an agreed-upon standard. The levels represent a gradual reduction of display quality that the virtual resource conserver can apply to the object when the opportunity arises to conserve computing resources. The gradual reduction of display quality can correlate to a degree of usage of a computing resource. For example, the virtual resource conserver can subsequently activate the levels of reduction in the gradual order to maintain a computing resource below levels of usage that would cause performance degradation in the virtual universe. For instance, as a computing resource approaches a maximum usage level, the virtual resource conserver causes the object to activate a first level of display degradation, which could cause the computing resource usage to stabilize. However, as a busy period increases the usage of the computing resource, the virtual resource conserver could activate a second level, and so forth, to continue to stabilize the computing resource. The levels can also have setting values, which the virtual resource conserver selects, such as per request of a user of the virtual universe or an administrator, to authorize which levels the virtual resource conserver can apply.

In some embodiments, the operations can be performed in series, while in other embodiments, one or more of the operations can be performed in parallel. For example block 806, creating a resource conservation setting, can be performed before processing block 802, and processing block 804.

Figure 9:
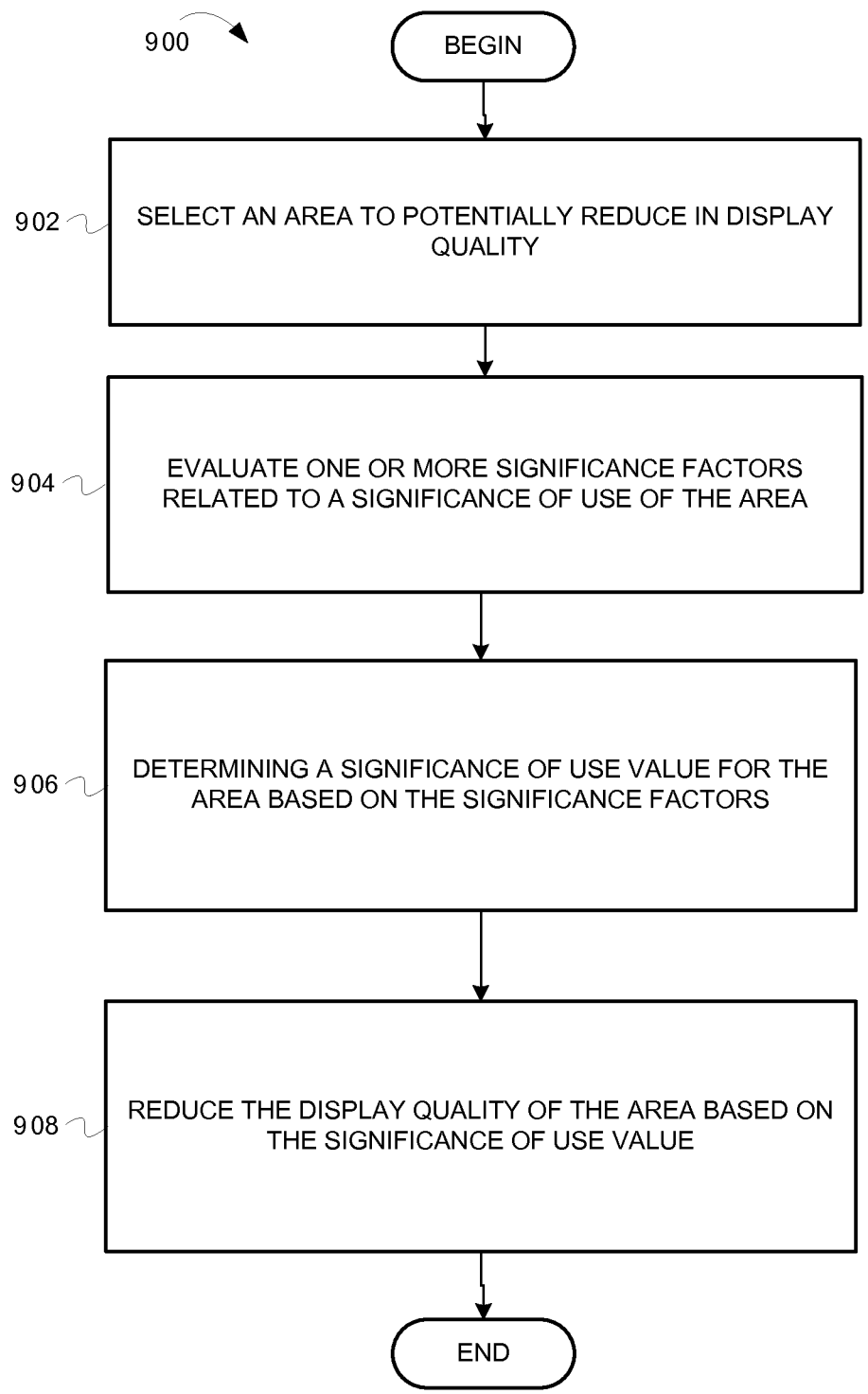
FIG. 9 is an example flow diagram 900 illustrating modifying a display of an area in a virtual universe based on a significance of use of the area, to conserve computing resources.

FIG. 9 is an example flow diagram illustrating modifying a display of an area in a virtual universe based on a significance of use of the area, to conserve computing resources. In FIG. 9, the flow 900 begins at processing block 902, where a virtual resource conserver selects an area of a virtual universe to potentially reduce in display quality. In one example, the virtual resource conserver determines boundary lines that demarcate the area. The virtual resource conserver may determine the area based on predetermined boundary line values, or by creating the boundary lines according to logical rules. For instance, the virtual resource conserver determines boundary lines by determining any objects that are within a specified distance of an avatar. In other instances, the virtual resource conserver determines boundary lines by determining the boundary of a computing resources control over the virtual universe. The area contains one or more objects. The one or more objects have displayable characteristics, such as textures, colors, actions, etc. The area can also have avatars occupying the area. The virtual resource conserver may analyze the state of the computing resources that are used to display the area in the virtual universe. If those computing resources are experiencing performance issues, inefficiency, or over usage, the virtual resource conserver may select all areas under the computing resources' control to determine whether, and to what degree, some displayable characteristics may be reduced in display quality to conserve some of the computing resources.

The flow 900 continues at processing block 904, where the virtual resource conserver evaluates one or more significance factors related to a significance of use of the area. For brevity, the term "significance factors" will be used in this description to mean "one or more significance factors". Significance factors are information, conditions, or characteristics relating to the nature of an activity in, or a purpose for, an area in the virtual universe, such as whether or not the activity in the area has been flagged as being important, if the activity is sponsored or scheduled, if the activity has a strong monetary importance, or the area has a significance that relates strongly to a goal or purpose of the virtual universe.

In some examples, the significance factors can even be evaluated to determine what area the virtual resource conserver selects at processing block 902. In other words, processing block 902 and 904 may be processed simultaneously, or in reverse order. For instance the virtual resource conserver may patrol computing resources on the virtual network, as part of a resource conservation plan, looking specifically for areas that can be reduced in display quality, even though the computing resources controlling those areas may not be experiencing performance issues. The virtual resource conserver could evaluate significance factors to select areas for its resource conservation plan. In one example, the virtual resource conserver analyzes avatars that occupy an area. For instance, the virtual resource conserver counts the number of avatars in the area ("avatar population"). Based on the avatar population, the virtual resource conserver can calculate a degree, or amount, of significance of use for the area so that the virtual resource conserver can reduce the display quality for the area.

The flow 900 continues at processing block 906, where the virtual resource conserver determines a significance of use value based on the evaluated significance factors. When the virtual resource conserver has evaluated the significance factors, the virtual resource conserver generates from the evaluation a quantifiable value indicating a significance (e.g. importance, degree, etc.) of use. In one example, the virtual resource conserver determines that an area has a certain number of avatars occupying the area. Thus, the virtual resource conserver converts the number of avatars directly into the quantifiable value, or weight, representing the significance of use, such as by using a predetermined conversion scale or chart. The conversion scale can be based on any kind of algorithm or formula (e.g. linear, exponential, etc.) with many factors or variables related to different significance factors. For instance, the virtual resource conserver determines, as described at processing block 904, that zero avatars occupy an area, and thus, at processing block 906, converts the "zero" number directly to a "low" significance of use value. Similarly, the virtual resource conserver determines that one to two avatars occupy an area, and thus convert the "1-2" number range directly to a "medium" significance of use value. Further, the virtual resource conserver may determine that more than two avatars occupy an area, and thus convert the ">2" number range directly to a "high" significance of use value. In other examples, however, the virtual resource conserver evaluates significance factors other than, or in addition to, avatar population, and computes a significance of use value by using a combination of evaluated significance factors. For example, the conversion formula for determining a significance of use may compute a first significance factor, avatar population, and a second significance factor, "event importance", which relates to an importance of a scheduled event in the area at a given date and time. The virtual resource conserver computes the evaluation of the event importance and the avatar population, to generate a significance of use value. For example, the area may be holding a sponsored event that, during the first two hours of the event, the significance of the event importance has a weighted value, which outweighs the significance of the avatar population, resulting in a "high" significance of use value. However, after a certain time period, such as after the first two hours of the event, the importance of the sponsored event diminishes linearly, so that the significance of the avatar population has a greater influence on the conversion scale formula. Further, the virtual resource conserver could determine significance of use values according to many different levels or scales of significance other than "high", "medium" and "low".

The flow 900 continues at processing block 908, where the virtual resource conserver reduces the display quality of the area based on the significance of use of the area. For instance, the virtual resource conserver determines a "low" significance of use value, and consequently reduces the display quality of the area to a "high" degree, or completely removes the display of the area. If, however, the virtual resource conserver determines a "medium" significance of use value, the virtual resource conserver reduces the display quality of the area to a "moderate" degree. Alternatively, if the virtual resource conserver determines a "high" significance of use value, the virtual resource conserver reduces the display quality to a "low" degree, or not at all. Further, the virtual resource conserver could reduce display quality according to many different levels or scales of significance other than just "high", "moderate" or "low". The different levels could relate to many different display characteristics based on the significance factors. For instance, the virtual resource conserver analyzes the area characteristics and the area actions to assess an area situation or condition. In some situations or conditions for the area, for example, the virtual resource conserver determines that it would be logical or more efficient to reduce display quality in one way more than another way, such as removing texture of an object in a dark environment instead of removing luminosity, or vice versa for a light environment.

As the virtual resource conserver reduces the display quality of areas, the virtual resource conserver can reduce usage of computing resources used to display the areas. For instance, as described in further detail herein, the virtual resource conserver can reduce processor usage, memory usage, disk space usage, data transfer, etc. by the computing resources. In some examples, the virtual resource conserver can gradually reduce the display quality of the area, such as by utilizing a set of levels for reducing display quality and by using smart objects with conservation settings that comprise levels of reducing display quality.

Further, in some examples, the virtual resource conserver could perform a reverse procedure to increase display quality of areas that have already been reduced. For instance, areas of the virtual universe could be reduced, either as a result of the flow 900, or because the default condition of the area could be reduced in quality. The virtual resource conserver, therefore, could evaluate significance factors for increasing display quality of areas based on a significance of use. For example, the virtual resource conserver could initially present an area with a reduced display quality, but then increase the display quality area based on the number of avatars occupying the area. For example, the virtual resource conserver may reduce the display quality of all areas that do not have avatars. However, as an avatar approaches, and occupies the area, the virtual resource conserver increases the display quality of the area. If more avatars occupy the area, then the virtual resource conserver could increase the display quality even more.

In some embodiments, the operations can be performed in series, while in other embodiments, one or more of the operations can be performed in parallel. For example, as described above, block 902 and 904 could be performed in parallel.

Figure 10:
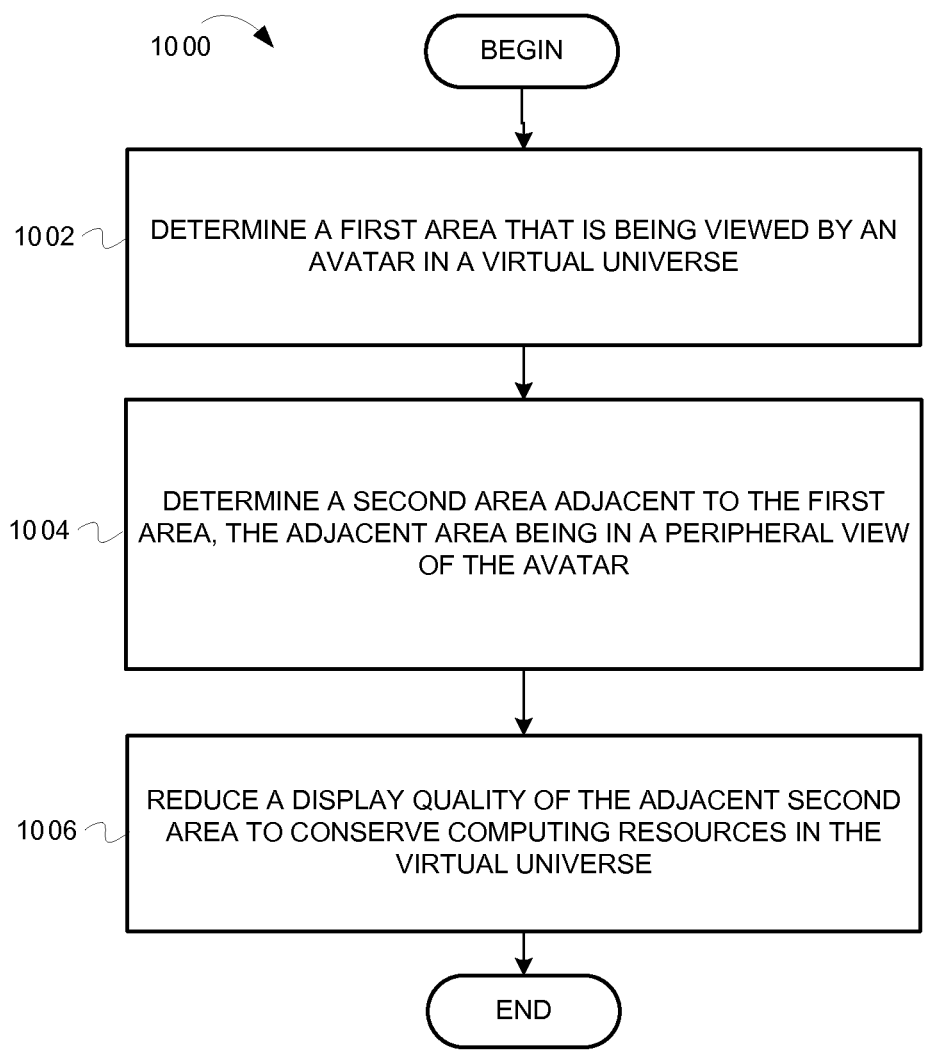
FIG. 10 is an example flow diagram 1000 illustrating modifying a view of an area in a virtual universe based on an avatar's perspective, to conserve computing resources.

FIG. 10 is an example flow diagram illustrating modifying a view of an area based on an avatar's perspective to conserve computing resources. In FIG. 10, the flow 1000 begins at processing block 1002, where a virtual resource conserver determines a first area that is being viewed by an avatar in a virtual universe. For instance, the virtual resource conserver could calculate a directly facing field of vision for the avatar. Anything within the direct field of vision would represent the area that the avatar is viewing directly in front of the avatar. The virtual resource conserver could calculate the direct field of vision, for example, by calculating a direct angle of view. The direct angle of view represents the breadth, or width, of the area directly in front of the avatar. For instance, the virtual resource conserver could calculate the direct angle of view by considering a width of an area of interest, such as the width of coordinates that encompass an object that the avatar is using, or other objects connected to that object. The virtual resource conserver could further calculate the direct angle of view based on a pre-determined angle for all avatars in the virtual universe. The virtual resource conserver could also calculate the direct angle of view based on boundaries of an area that a computing resource controls. The virtual resource conserver could also determine the direct angle of view based on an activity that the avatar is engaged in. For instance, a significant activity may demand a wide direct angle of view, such as fighting a battle, seeking an avatar or hunting a creature, etc. Other activities, however, may be less significant and the virtual resource conserver could determine a narrower direct angle of view. FIG. 4 above illustrates this concept.

The flow 1000 continues at processing block 1004, where the virtual resource conserver determines a second area adjacent to the first area, the adjacent area being in a peripheral view of the avatar. For instance, the virtual resource conserver could determine that any viewable area, or areas, adjacent to, or beyond, the avatar's direct field of vision are the avatar's "peripheral view areas". In other words, peripheral view areas are viewable areas to the right and left of the area encompassed by the direct angle of view. Hence, the virtual resource conserver could determine more than one second area since there are peripheral views to the right and left of the direct angle of view. The peripheral view areas can be controlled by one or more computing resources. In one example, the one or more computing resources could be the same computing resource that control objects and activities in the first area. In another example, the one or more computing resources could be different computing resources than those that control the first area. In yet other examples, there could be a combination of computing resources that control the second and the first area simultaneously.

The flow 1000 continues at processing block 1006, where the virtual resource conserver reduces a display quality of the second, adjacent area to conserve computing resources in the virtual universe. The second area, for example, could be the areas in the avatar's peripheral view. The virtual resource conserver reduces the display quality of objects within the second area. For instance, the virtual resource conserver reduces or removes textures, colors, actions, movements, etc. of the objects. The virtual resource conserver reduces usage of the one or more computing resources that process data for presenting the objects in the second area. For instance, as described in further detail herein, the virtual resource conserver can reduce processor usage, memory usage, disk space usage, data transfer, etc. by the computing resources that control the second area. By reducing usage of the computing resources, the second, peripheral view area, reduces in display quality. Alternatively, the virtual resource conserver reduces the display quality of the one or more second, peripheral view areas, by processing quality reduction instructions that reduce the display quality of objects in the peripheral view areas, which indirectly reduces usage of the computing resources.

In some examples, users can volunteer to experience limited views. The virtual resource conserver, for example, rewards users for volunteering to experience limited views. In other examples, the virtual resource conserver imposes limited views upon users. In some examples, the virtual resource conserver reduces the display of areas as a result of the flow 900, or as a default state, and then determines when areas enter an avatar's direct field of vision. The virtual resource conserver then increases the display quality of those areas that entered the avatar's direct field of vision. Also, in some examples, the virtual resource conserver can gradually reduce the display quality of the area, such as by utilizing a set of levels for reducing display quality and/or by using smart objects with conservation settings that comprise levels of reducing display quality.

In some embodiments, the operations can be performed in series, while in other embodiments, one or more of the operations can be performed in parallel. For example, processing block 1002 and 1004 could be processed simultaneously.

Figure 11:
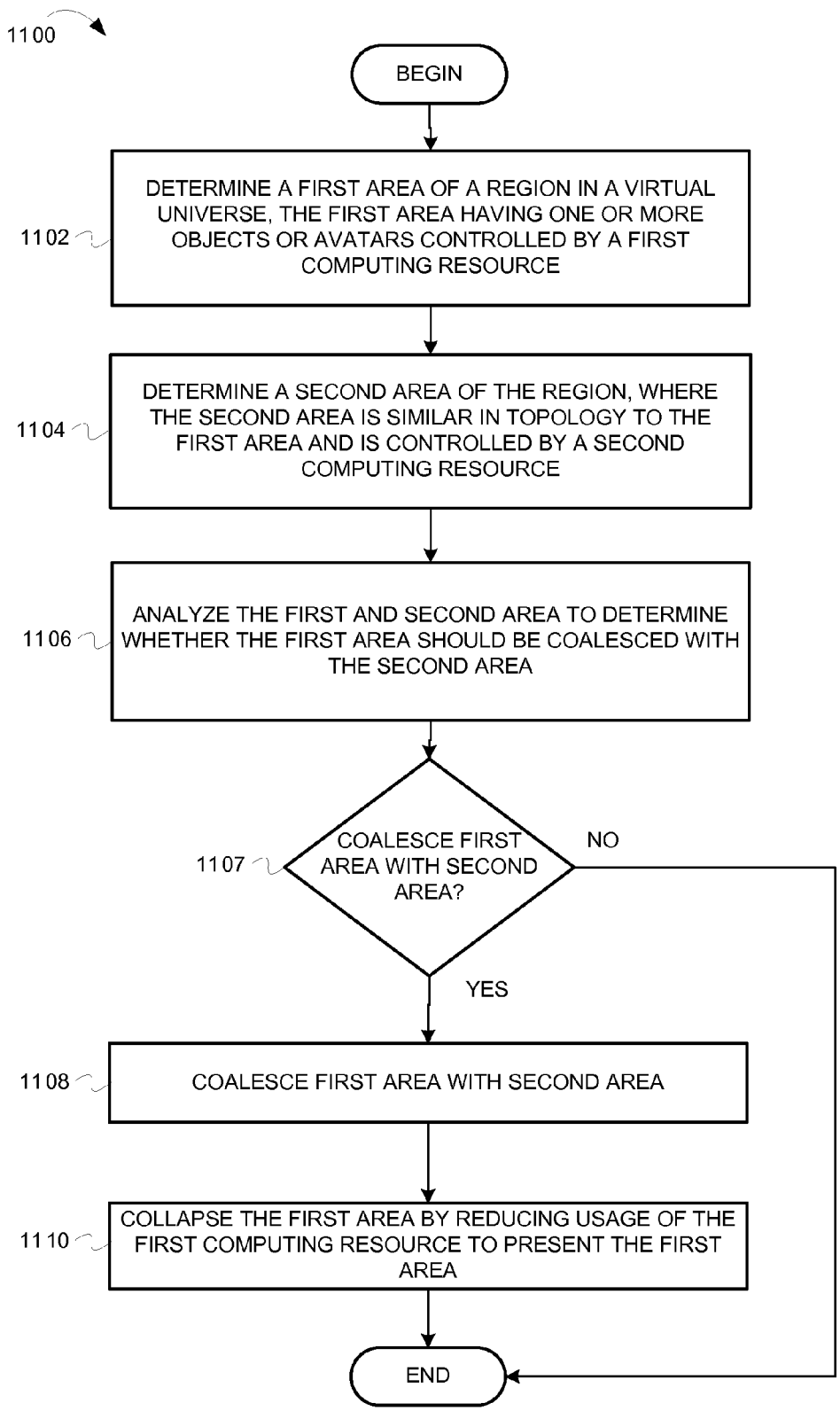
FIG. 11 is an example flow diagram 1100 illustrating collapsing areas and computing resources in a virtual universe to conserve computing resources.

FIG. 11 is an example flow diagram illustrating collapsing areas and computing resources in a virtual universe to conserve computing resources. In FIG. 11, the flow 1100 begins at processing block 1102, where a virtual resource conserver determines a first area of a region in a virtual universe, the first area having one or more objects or avatars controlled by a first computing resource. In one example, the first computing resource processes data for presenting the first area and also processes session data for controlling the one or more avatars in the first area. In other examples, however, a combination of resources could process data for presenting the area and data for processing session data. In yet other examples, portions, or sections, of a single computing resource, (e.g., partitions of a single database, processors of a single server, etc.) could control the first area of the region, whereas other portions, or sections, of the same computing resource could control other areas of the region. The portions, or sections, can be considered as separate computing resources for purposes of this description. The region includes one or more avatars, one or more topology objects, and one or more interactive objects. Topology objects and interactive objects are described detail in FIG. 5 above. The virtual resource conserver can evaluate characteristics of the objects in the area to determine if the objects are topology objects, interactive objects or avatars. For instance, the virtual resource conserver can look at the objects abilities. If the virtual resource conserver recognizes that the object can move or react, it may determine that the object is an interactive object. The virtual resource conserver can also determine a significance of an object, or rather, the significance of the object's use or purpose in the area. A significant object is an object that the virtual resource conserver does not remove from display, other than to move the object from one area to another area. For instance, a significant object can be an object with which an avatar may interact, or possibly interact, an object that plays a significant purpose of the area, an object that possesses a valuable or important characteristic, etc. The virtual resource conserver moves significant objects from area to area when coalescing and collapsing areas. Coalescing, or combining, an area means to move objects of significance, such as avatars and/or interactive objects, out of one area into another area in a region of the virtual universe. To collapse an area means to remove, or significantly reduce a display quality of, objects in the area. In some examples, collapsing an area means to temporarily crop the entire area from the virtual universe. Collapsing an area is also described in further detail above in FIG. 5, The flow 1100 continues at processing block 1104, where the virtual resource conserver determines a second area, within the region, that is similar in topology to the first area and is controlled by a second computing resource. The second computing resource processes data for presenting the second area. The second area is a part of the region and may be adjacent to, or near, the first area. The topology of the second area is consistent with the topology of the first area because they are both within a region that has common properties or functions, such as common landscaping or common activities that an avatar could perform.

The flow 1100 continues at processing block 1106, where the virtual resource conserver analyzes factors about the first and second areas to be used to for deciding whether to coalesce the areas. For example, the virtual resource conserver analyzes factors about the first area and second area to determine which one of the two areas should be combined into, or coalesced with, the other area. For instance, the virtual resource conserver analyzes the first area and determines that the first area has one avatar engaged in an activity using an interactive object in the first area. The virtual resource conserver analyzes the second area and determines that two avatars are engaged in a similar activity using similar interactive objects in the second area. Consequently, the virtual resource conserver determines that it would be more efficient to combine the first area into the second area because moving one avatar would be more efficient than moving two. In addition, the virtual resource conserver could determine other factors, such as whether the computing resource that controls the second area can more efficiently process three avatars than the first area, or if one of the computing resources is experiencing performance problems. Thus, the virtual resource conserver can analyze multiple factors and combinations of factors to determine which area should be coalesced and which area should be collapsed. The virtual resource conserver can also analyze the computing resources controlling the first area and the second area to determine if there would be a savings to computing resources to coalesce and collapse areas.

The flow 1100 continues at decisional block 1108, where the virtual resource conserver determines, based on the analysis of the first and second area, whether the first area should be coalesced with the second area. If the virtual resource conserver determines that the first area should be coalesced with the second area, the flow 1100 continues at processing block 1108. If, however, the virtual resource conserver determines that the first area should not be coalesced with the second area, then the process ends.

The flow 1100 continues at processing block 1108, where the virtual resource conserver coalesces the first area with the second area. The virtual resource conserver coalesces the first area with the second area by moving objects of significance from the first area to the second area, including any avatars in the area along with any interactive objects that the avatars are using. If there are no avatars, the virtual resource conserver may decide not to move any objects, or may move only a few interactive object to the second area. When moving an avatar from the first area to the second area, the virtual resource conserver can orient the avatar, such as by demonstrating to the avatar where it will be moved. The virtual resource conserver may demonstrate to the avatar the location on a map, or with visual indicators, like arrows or lines that show that movement will occur from a point in, or section of, the first area to a point in, or section of, the second area. The virtual resource conserver transfers data, for presenting the avatars and objects, from the first computing resource to the second computing resource. The virtual resource conserver also moves any session data from the first computing resource to the second computing resource. Session data includes data used to maintain a connection between a client and a virtual universe server so that the client can control the avatar's movements. Methods are known for transferring session data between servers and other computing resources, such as via a teleportation procedure within the virtual universe or by using a virtual data transfer application or function.

The flow 1100 continues at processing block 1110, where the virtual resource conserver collapses the first area by reducing usage of the first computing resource. For instance, the virtual resource conserver removes all topology objects from the first area as well as any interactive objects that remained in the first area after coalescing the first and second areas. In some examples, the virtual resource conserver crops the area from the virtual universe view and connects the boundaries of adjacent areas. The virtual resource conserver reduces resource usage from the first computing resource in one of many ways. For example, the virtual resource conserver could shut off or reduce power, activate a sleep or hibernation mode, reduce processor cycles, reduce memory usage, reduce disk usage, etc.

In some embodiments, the operations can be performed in series, while in other embodiments, one or more of the operations can be performed in parallel. For example the virtual resource conserver could determine the first area, processing block 1102, and determine the second area, processing block 1104, in parallel. Further, the virtual resource conserver could coalesce the first area, processing block 1108, and collapse the first area, processing block 1110, in parallel.

Example Virtual Resource Conserver Network

Figure 12:
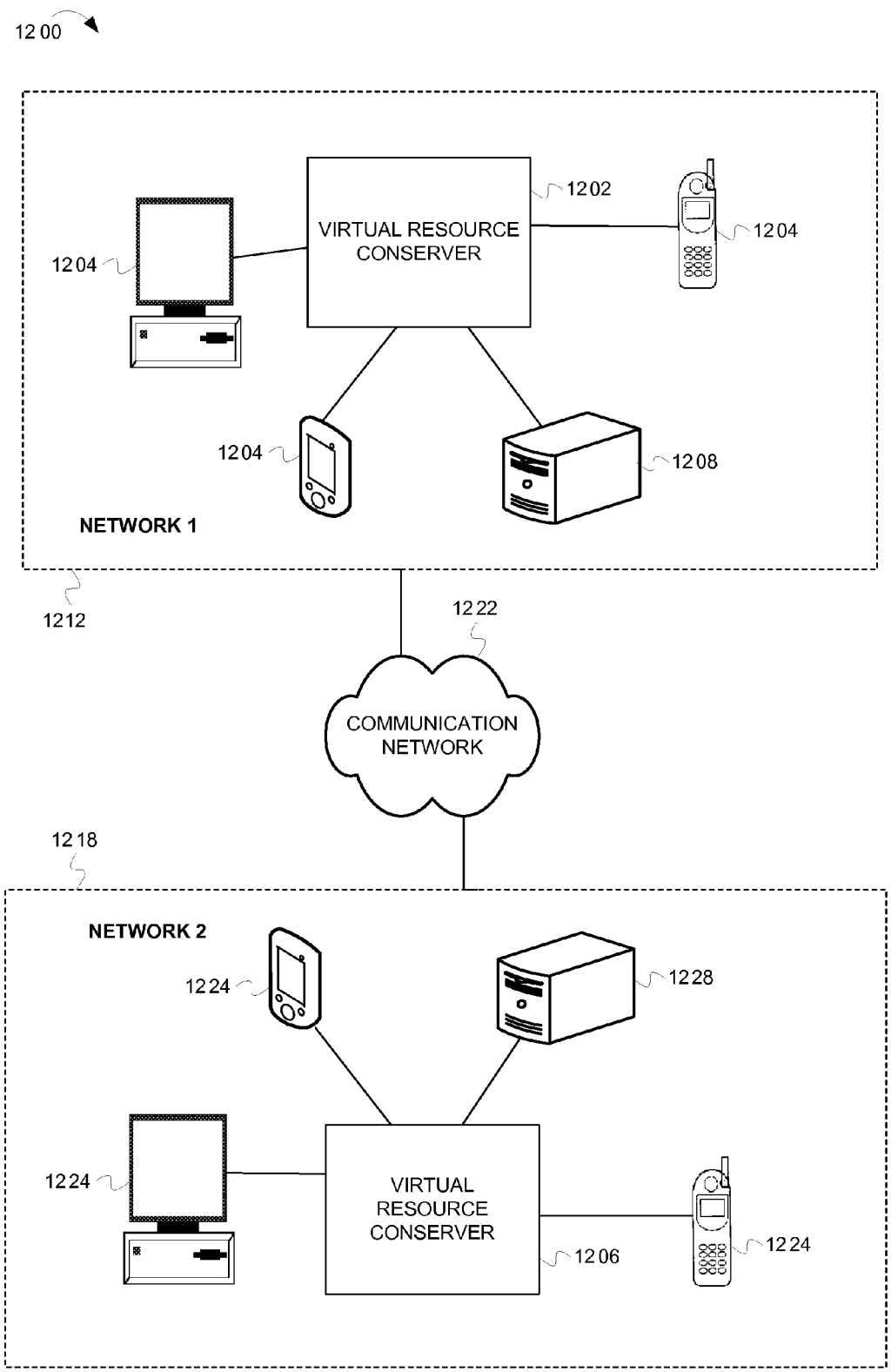
FIG. 12 is an illustration of an example virtual resource conserver 1202 on a network 1200.

FIG. 12 is an illustration of a virtual resource conserver 1202 on a network 1200. In FIG. 12, the network 1200, also referred to as a virtual resource conserver network 1200, includes a first local network 1212 that includes network devices 1204 and 1208 that can use the virtual resource conserver 1202. Example network devices 1204 and 1208 can include personal computers, personal digital assistants, mobile telephones, mainframes, minicomputers, laptops, servers, or the like. In FIG. 12, some network devices 1204 can be clients ("clients") that can work in conjunction with a server device 1208 ("server"). Any one of the network clients 1204 and server 1208 can be embodied as the computer system described in FIG. 13. A communications network 1222 connects a second local network 1218 to the first local network 1212. The second local network 1218 also includes client 1224 and a server 1228 that can use a virtual resource conserver 1206.

Still referring to FIG. 12, the communications network 1212 can be a local area network (LAN) or a wide area network (WAN). The communications network 1212 can include any suitable technology, such as Public Switched Telephone Network (PSTN), Ethernet, 802.11g, SONET, etc. For simplicity, the virtual resource conserver network 1200 shows only six clients 1204, 1224 and two servers 1208, 1228 connected to the communications network 1222. In practice, there may be a different number of clients and servers. Also, in some instances, a device may perform the functions of both a client and a server. Additionally, the clients 1204, 1224 can connect to the communications network 1222 and exchange data with other devices in their respective networks 1212, 1218 or other networks (not shown). In addition, the virtual resource conservers 1202 and 1206 may not be standalone devices. For example, the virtual resource conserver 1202 may be distributed across multiple machines, perhaps including the server 1208. The virtual resource conserver 1202 may be embodied as hardware, software, or a combination of hardware and software in a server, such as the server 1208. One or both of the virtual resource conservers 1202 and 1206 may also be embodied in one or more client machines, possibly including one or more of the clients 1204 and 1224. For instance, servers can embody functionality (e.g., as code, a processing card, etc.) that searches a virtual universe for smart objects, reduces views, or performs other techniques described herein. Functionality for conserving computing resources in the virtual universe can be embodied in one or more server machines or distributed as tasks to client machines accessing the virtual universe. For example, storing and tracking smart objects, or calculating views and perspectives may be performed as a background task on client machines distributed by servers.

Example Virtual Resource Conserver Computer System

Figure 13:
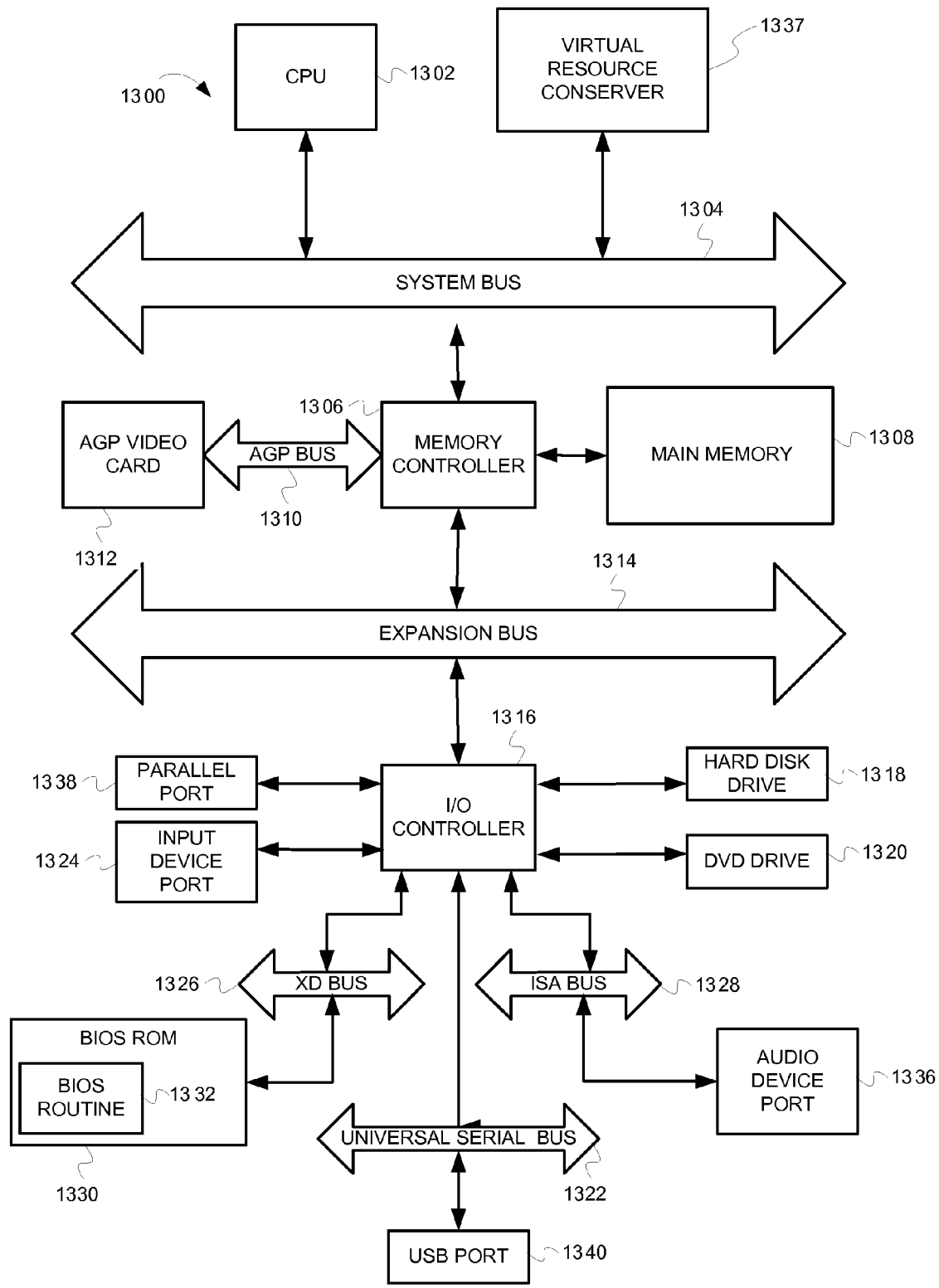
FIG. 13 is an illustration of an example virtual resource conserver computer system 1300.

FIG. 13 is an illustration of a virtual resource conserver computer system 1300. In FIG. 13, the virtual resource conserver 1300 ("computer system") includes a CPU 1302 connected to a system bus 1304. The system bus 1304 is connected to a memory controller 1306 (also called a north bridge), which is connected to a main memory unit 1308, AGP bus 1310 and AGP video card 1312. The main memory unit 1308 can include any suitable memory random access memory (RAM), such as synchronous dynamic RAM, extended data output RAM, etc.

In one embodiment, the computer system 1300 includes a virtual resource conserver 1337. The virtual resource conserver 1337 can process communications, commands, or other information, to conserve computing resources in a virtual universe. The virtual resource conserver 1337 is shown connected to the system bus 1304, however the virtual resource conserver 1337 could be connected to a different bus or device within the computer system 1300. The virtual resource conserver 1337 can include software modules that utilize main memory 1308. For instance, the virtual resource conserver 1337 can wholly or partially be embodied as a program product in the main memory 1308. The virtual resource conserver 1337 can be embodied as logic in the CPU 1302 and/or a co-processor, one of multiple cores in the CPU 1302, etc.

An expansion bus 1314 connects the memory controller 1306 to an input/output (I/O) controller 1316 (also called a south bridge). According to embodiments, the expansion bus 1314 can be include a peripheral component interconnect (PCI) bus, PCIX bus, PC Card bus, CardBus bus, InfiniBand bus, or an industry standard architecture (ISA) bus, etc.

The I/O controller is connected to a hard disk drive (HDD) 1318, digital versatile disk (DVD) 1320, input device ports 1324 (e.g., keyboard port, mouse port, and joystick port), parallel port 1338, and a universal serial bus (USB) 1322. The USB 1322 is connected to a USB port 1340. The I/O controller 1316 is also connected to an XD bus 1326 and an ISA bus 1328. The ISA bus 1328 is connected to an audio device port 1336, while the XD bus 1326 is connected to BIOS read only memory (ROM) 1330.

In some embodiments, the computer system 1300 can include additional peripheral devices and/or more than one of each component shown in FIG. 13. For example, in some embodiments, the computer system 1300 can include multiple external multiple CPUs 1302. In some embodiments, any of the components can be integrated or subdivided.

Any component of the computer system 1300 can be implemented as hardware, firmware, and/or one or more machine-readable storage devices including instructions for performing the operations described herein.

The described embodiments may be provided as a computer program product, or software, that may include a machine-readable storage device having stored thereon instructions, which may be used to program a computer system (or other electronic device(s)) to perform a process according to embodiments of the invention(s), whether presently described or not, because every conceivable variation is not enumerated herein. A machine readable storage device includes any tangible mechanism for storing information in a form (e.g., software, processing application) readable by a machine (e.g., a computer). The machine-readable storage device may include, but is not limited to, a magnetic storage device (e.g., floppy diskette); an optical storage device (e.g., CD-ROM); a magneto-optical storage device; a read only memory (ROM); a random access memory (RAM); an erasable programmable memory (e.g., EPROM and EEPROM); a flash memory; or other types of devices suitable for storing electronic instructions.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Although examples refer to smart objects to reduce computing resources, objects that are not smart can be reduced in quality, or prepared to be smart objects. In other examples, some areas are described as being adjacent within a region, although in some examples some areas may be adjacent, but border separate regions. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A computer system for modifying an appearance of an area of a virtual universe, the computer system comprising:

one or more processors, one or more tangible computer-readable memories, and one or more computer-readable tangible storage devices;

program instructions, stored on at least one of the one or more storage devices for execution by at least one of the one or more processors via at least one of the one or more memories, to determine a number of avatars that occupy an area of a virtual universe;

program instructions, stored on at least one of the one or more storage devices for execution by at least one of the one or more processors via at least one of the one or more memories, to determine a display quality of the area of the virtual universe that can be reduced to conserve a computing resource that processes data to present the area of the virtual universe;

program instructions, stored on at least one of the one or more storage devices for execution by at least one of the one or more processors via at least one of the one or more memories, to reduce the display quality of the area of the virtual universe proportionally to the number of avatars that occupy the area of the virtual universe, and in response, to reduce usage of the computing resource to process the data to present the area of the virtual universe; and program instructions, stored on at least one of the one or more storage devices for execution by at least one of the one or more processors via at least one of the one or more memories, to convert a first value that represents the number of avatars to a second value that represents a range of avatar population in the area.

2. The computer system of claim 1 further comprising:
program instructions, stored on at least one of the one or more storage devices for execution by at least one of the one or more processors via at least one of the one or more memories, to select the area based on boundary lines that mark a section of the virtual universe controlled by the computing resource.

3. The computer system of claim 1 wherein the program instructions to reduce the display quality of the area reduce the usage of the computing resource proportional to the second value.

4. The computer system of claim 1 wherein the program instructions to reduce the display quality of the area determine that there are no avatars that occupy the area, and in response, remove a display of objects within the area.

5. The computer system of claim 1 further comprising:
program instructions, stored on at least one of the one or more storage devices for execution by at least one of the one or more processors via at least one of the one or more memories, to modify the display quality of the area based on an additional number of avatars outside and in proximity to the area.

6. A computer program product for modifying an appearance of an area of a virtual universe, the computer program product comprising:
one or more computer-readable tangible storage devices;
program instructions, stored on at least one of the one or more storage devices, to determine a number of avatars that occupy an area of a virtual universe;
program instructions, stored on at least one of the one or more storage devices, to determine a display quality of the area of the virtual universe that can be reduced to conserve a computing resource that processes data to present the area of the virtual universe;
program instructions, stored on at least one of the one or more storage devices, to reduce the display quality of the area of the virtual universe proportionally to the number of avatars that occupy the area of the virtual universe, and in response, to reduce usage of the computing resource to process data to present the area of the virtual universe; and
program instructions, stored on at least one of the one or more storage devices, to convert a first value that represents the number of avatars to a second value that represents a range of avatar population in the area.

7. The computer program product of claim 6, further comprising program instructions, stored on at least one of the one or more storage devices, to select the area based on boundary lines that mark a section of the virtual universe controlled by the computing resource.

8. The computer program product of claim 6, wherein the program instructions to reduce the display quality of the area reduce the usage of the computing resource proportional to the second value.

9. The computer program product of claim 6, wherein the program instructions to reduce the display quality of the area determine that there are no avatars that occupy the area, and in response, remove a display of objects within the area.

10. The computer program product of claim 6 further comprising program instructions, stored on at least one of the one or more storage devices, to reduce the display quality of the area quality based on one or more of a virtual real-estate boundary within the area, a monetary significance of the area, and a goal associated with the area.

11. The computer program product of claim 6 further comprising: program instructions, stored on at least one of the one or more storage devices, to present the area in response to reducing the display quality of the area.

12. The computer program product of claim 11, wherein the program instructions to present the area modify one or more of a number of objects presented in the area, an amount of textures in the area, and a number of colors presented in the area.

13. A computer program product for modifying an appearance of an area of a virtual universe, the computer program product comprising:
one or more computer-readable tangible storage devices;
program instructions, stored on at least one of the one or more storage devices, to perform an evaluation of a first significance value assigned to an activity that occurs in the area against a second significance value assigned to an avatar population value for the area;
program instructions, stored on at least one of the one or more storage devices, to determine, based on the evaluation, that the first significance value outweighs the second significance value; and
program instructions, stored on at least one of the one or more storage devices, to modify a display quality of the area in accordance with a determination that the first significance value outweighs the second significance value.

14. The computer program product of claim 13 further comprising program instructions, stored on at least one of the one or more storage devices, to provide a reward to one or more avatars in the area to reduce a display quality for the area in accordance with a display quality value associated with the second significance value, wherein the reward comprises at least one of a special privilege, a number of points, virtual currency, a discount, or access to a restricted function.

15. The computer program product of claim 13 further comprising:
program instructions, stored on at least one of the one or more storage devices, to determine, based on the second significance value, that a first display quality value for the area should be reduced to a second display quality value that corresponds to the second significance value; and program instructions, stored on at least one of the one or more storage devices, to reduce the display quality of the area to the second display quality value after a time period associated with the activity in accordance with the determination that that the first significance value outweighs the second significance value.

16. The computer program product of claim 13, wherein the program instructions to modify the display quality of the area:

detect a linear diminishing of the first significance value associated with the activity; and gradually reduce the display quality of the area in accordance with the linear diminishing of the first significance value.

17. The computer system of claim 1 wherein the program instructions to reduce the display quality of the area proportionally to the number of avatars that occupy the area reduce a display quality of one or more of a building in the area, landscaping of the area, topology of the area, and all objects within the area.

18. The computer system of claim 1, wherein the program instructions to reduce the display quality of the area proportionally to the number of avatars that occupy the area:

determine that a third value assigned to an event that occurs within the area outweighs the second value; and delay reduction of the display quality in response to a determination that the third value outweighs the second value.

19. The computer program product of claim 6, wherein the program instructions to reduce the display quality of the area proportionally to the number of avatars that occupy the area:

determine that a third value assigned to an event that occurs within the area outweighs the second value, and delay reduction of the display quality in response to a determination that the third value outweighs the second value.

20. A computer system for modifying an appearance of an area of a virtual universe, the computer system comprising:

one or more processors, one or more tangible computer-readable memories, and one or more computer-readable tangible storage devices;

program instructions, stored on at least one of the one or more storage devices for execution by at least one of the one or more processors via at least one of the one or more memories, to determine a number of avatars that occupy an area of a virtual universe;

program instructions, stored on at least one of the one or more storage devices for execution by at least one of the one or more processors via at least one of the one or more memories, to determine a display quality of the area of the virtual universe that can be reduced to conserve a computing resource that processes data to present the area of the virtual universe;

program instructions, stored on at least one of the one or more storage devices for execution by at least one of the one or more processors via at least one of the one or more memories, to reduce the display quality of the area of the virtual universe proportionally to the number of avatars that occupy the area of the virtual universe, and in response, to reduce usage of the computing resource to process the data to present the area of the virtual universe; and program instructions, stored on at least one of the one or more storage devices for execution by at least one of the one or more processors via at least one of the one or more memories, to gradually modify the display quality of the area based on a change to the number of avatars over time.

21. A computer program product for modifying an appearance of an area of a virtual universe, the computer program product comprising:

one or more computer-readable tangible storage devices;

program instructions, stored on at least one of the one or more storage devices, to determine a number of avatars that occupy an area of a virtual universe;

program instructions, stored on at least one of the one or more storage devices, to determine a display quality of the area of the virtual universe that can be reduced to conserve a computing resource that processes data to present the area of the virtual universe;

program instructions, stored on at least one of the one or more storage devices, to reduce the display quality of the area of the virtual universe proportionally to the number of avatars that occupy the area of the virtual universe, and in response, to reduce usage of the computing resource to process data to present the area of the virtual universe; and program instructions, stored on at least one of the one or more storage devices, to reduce the display quality of the virtual universe based on a user setting that indicates to voluntarily have the display quality reduced.

* * * * *